US012299945B2

United States Patent
Li

(10) Patent No.: US 12,299,945 B2
(45) Date of Patent: May 13, 2025

(54) PREDICTIVE CODING OF LENSLET IMAGES

(71) Applicant: Adeia Guides Inc., San Jose, CA (US)

(72) Inventor: Zhu Li, Overland Park, KS (US)

(73) Assignee: Adeia Guides Inc., San Jose, CA (US)

( * ) Notice: Subject to any disclaimer, the term of this patent is extended or adjusted under 35 U.S.C. 154(b) by 450 days.

(21) Appl. No.: 17/734,611

(22) Filed: May 2, 2022

(65) Prior Publication Data

US 2023/0351642 A1    Nov. 2, 2023

(51) Int. Cl.
G06T 9/00      (2006.01)
G06N 3/045     (2023.01)
G06T 3/4046    (2024.01)

(52) U.S. Cl.
CPC ............. G06T 9/002 (2013.01); G06N 3/045 (2023.01); G06T 3/4046 (2013.01)

(58) Field of Classification Search
CPC ........ G06T 9/002; G06T 3/4046; G06N 3/045
See application file for complete search history.

(56) References Cited

U.S. PATENT DOCUMENTS

| 9,384,424 B2 | 7/2016 | Grefalda et al. |
| 2023/0262214 A1* | 8/2023 | Ray .................... H04N 19/186 375/240.02 |

OTHER PUBLICATIONS

Pfaff, Jonathan, Philipp Helle, Philipp Merkle, M. Schäfer, Björn Stallenberger, Tobias Hinz, Heiko Schwarz, Detlev Marpe, and Thomas Wiegand. "Data-driven intra-prediction modes in the development of the versatile video coding standard." ITU J. ICT Discoveries 3, No. 1 (2020): 25-32. (Year: 2020).*
Li, Lingjun, Xin Jin, and Tingting Zhong. "Imaging-correlated intra prediction for plenoptic 2.0 video coding." In 2020 IEEE International Conference on Multimedia and Expo (ICME), pp. 1-6. IEEE, 2020. (Year: 2020).*
Li, Lingjun et al., "Boundary matching based prediction for lenslet video compression," 125. MPEG Meeting; Jan. 14, 2019-Jan. 18, 2019; Marrakech, Jan. 8, 2019.
Li, Zhu et al., "Efficient Multi-band MLP Based Intra-prediction for Lenslet Image Compression," 2023 IEEE (ICCE), pp. 1-4 (Jan. 6, 2023).

(Continued)

Primary Examiner — David Perlman
(74) Attorney, Agent, or Firm — Haley Guiliano LLP

(57) ABSTRACT

Systems, methods and apparatuses are described herein for accessing image data, generated at least in part using a device comprising a lenslet array, determining a plurality of reference pixel blocks of the image data, and determining a prediction block in a vicinity of the reference pixel blocks. Implementing any of the technique(s) described herein, the system or systems may determine, based on the plurality of reference pixel blocks, a first component representing average pixel values of the prediction block, a second component representing low frequency pixel values of the prediction block, and a third component representing high frequency pixel values of the prediction block. The system(s) may determine predicted pixel values of the prediction block based on the first component, the second component and the third component, and encode the image data based at least in part on the predicted pixel values of the prediction block.

18 Claims, 9 Drawing Sheets

(56) References Cited

OTHER PUBLICATIONS

Liyanage, Namalka et al., "Low-complexity Real-Time Light Field Compression using 4-D Approximate DCT," 2019 IEEE (ISCAS), pp. 1-5 (Oct. 12, 2020).
Zhong, Tingting et al., "Light Field Image Compression Using Depth-based CNN in Intra Prediction," ICASSP 2019-2019 IEEE (ICASSP), pp. 8564-8567 (May 12, 2019).
Arai, et al., "Integral Three-Dimensional Television Using a 33-Megapixel Imaging System", Journal of Display Technology 6(10): 422-430 (Oct. 2010).
Shi, et al., "Near-eye Light Field Holographic Rendering with Spherical Waves for Wide Field of View Interactive 3D Computer Graphics", ACM Transactions on Graphics, vol. 36, No. 6, Article 236, 17 pages (Nov. 2017).
Zhang, et al., "Multiple Linear Regression for High Efficiency Video Intra Coding", IEEE International Conference on Acoustics, Speech and Signal, May 12-17, 2019, 5 pages (2019).

\* cited by examiner

DCT basis and Zigzag scan and output band organization.

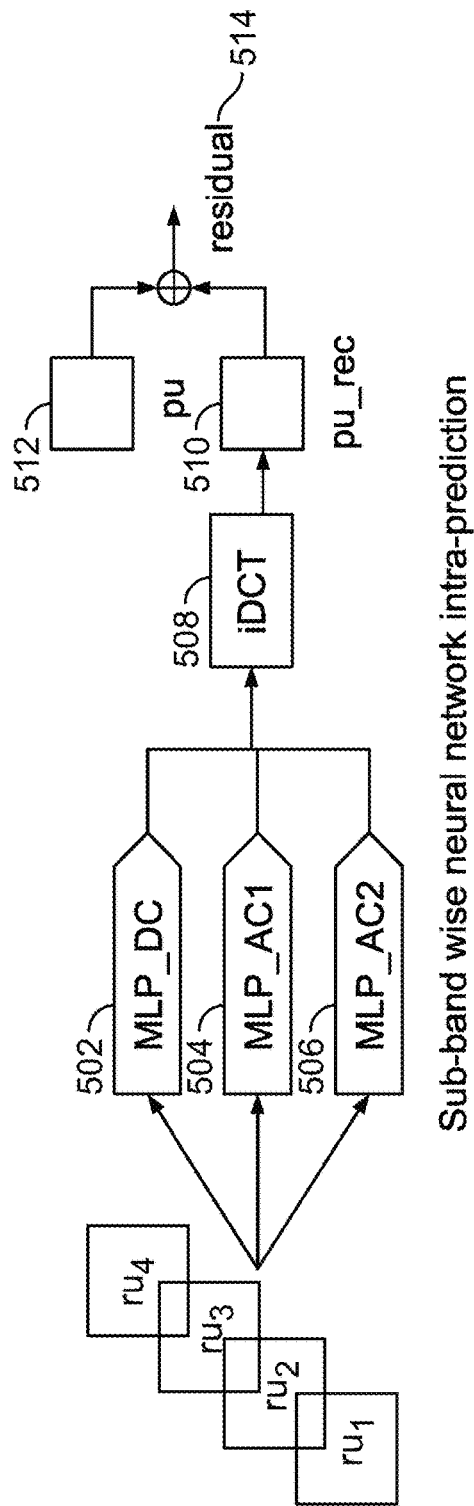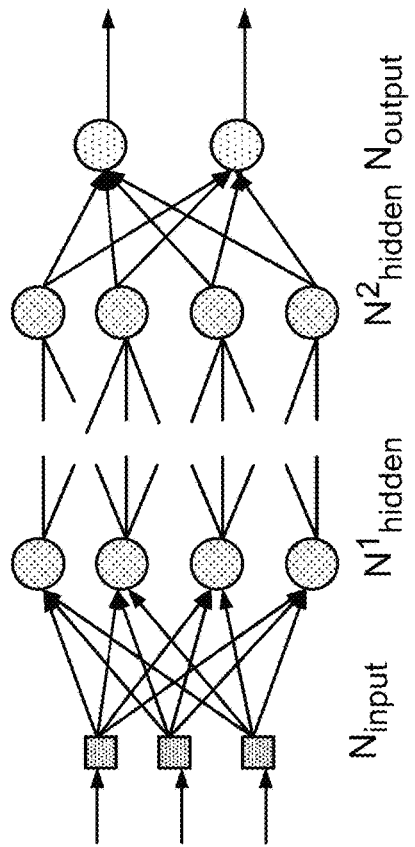
FIG. 5A
FIG. 5B

PREDICTIVE CODING OF LENSLET IMAGES

BACKGROUND

This disclosure is directed to systems and methods for encoding image data. In particular, the image data may be generated at least in part using a device comprising a lenslet array, and determining predicted pixel values of a prediction block of the image data based on a first component, a second component and a third component of the prediction block.

SUMMARY

With recent advances in display technology, image sensor technology and computation, particularly graphics processing units (GPUs), as well as increasing interest in immersive virtual experiences, the long-pursued concept of light field displays is becoming a more active area of commercial development. Light field (LF) is a three-dimensional (3D) capture solution that directly records four-dimensional (4D) plenoptic visual signals for immersive visual communication and interaction. Due to the highly redundant nature of the LF, the data volume generated is extremely large (e.g., including many high-resolution views) for storage and communication of LF data.

Lenslet images for LF-based 3D display and interaction are attracting a lot of industry attention. The compression of lenslet images presents unique challenges due to a macropixel structure of such images that is induced by lenslet arrays, such that traditional natural image coding schemes or codecs may not provide an adequate efficiency for compression of lenslet images. In one approach, codecs (e.g., HEVC) provide for encoding LF images block by block such as by encoding many synthetic aperture image (SAI) views as if they are a multi-view natural capture image sequence, e.g., process the bare pattern of the image in the pixel domain. For example, for a 17×17 SAI, 169 pieces of information need to be encoded, which may be inefficient and suboptimal. An LF camera may provide raw pixel sampling rates of, for example, 9344×7000 @ 30 fps, or 7920× 6004 @ 30 fps, i.e., a raw data rate of 95~131 Gbps, and thus a highly efficient encoding and/or compression solution is needed to significantly reduce the data rate for communication and storage of such data.

To overcome these drawbacks, apparatuses, systems and methods are provided herein for accessing image data, wherein the image data is generated at least in part using a device comprising a lenslet array. Implementing any of the one or more of the techniques described herein, a system or systems may determine a plurality of reference pixel blocks of the image data (each reference pixel block being a group of pixels from the image data). The system(s) may utilize one or more prediction blocks (each prediction block being a group of pixels from the image data in a vicinity of the reference pixel blocks, and the pixel values of predicted pixel blocks are to be predicted based on pixel values of the reference pixel blocks). More specifically, the system(s) may utilize the plurality of reference pixel blocks to determine multiple components of a prediction block. For example, based on the plurality of reference pixel blocks, the system(s) may determine a first component representing average pixel values of a prediction block of the image data, a second component representing low frequency pixel values of the prediction block, and a third component representing high frequency pixel values of the prediction block. The system(s) may determine predicted pixel values of the prediction block based on the first component, the second component and the third component. The system(s) may encode the image data based at least in part on the predicted pixel values of the prediction block. In some embodiments, the system(s) may generate a bitstream representing the encoded image data, and such bitstream may comprise an indication of the reference pixel blocks as well as a residual that is computed based on comparing the predicted pixel values of the prediction block to ground truth pixel values of the prediction block. Thus, the prediction block may be represented in the encoded image data by way of such residual value (which may contain significantly less information than the prediction block), and the system(s) need not transmit or store indications of each of the pixels values of prediction block, thereby minimizing an amount of data for storing and/or transmitting the encoded image data. In some embodiments, the system(s) may be configured to decode the bitstream representing the encoded image data based on the residual value and indications of reference pixel block values included in such bitstream. For example, the bitstream may comprise an indication of coordinates (e.g., an offset amount from the coordinates of the prediction block) of the reference pixel blocks within the encoded image data. The system(s) may decode the encoded image data by locating such reference pixel blocks within the encoded image data based on the specified coordinates in the bitstream, and applying (e.g., adding) the residual value specified in the bitstream to the reference pixel blocks to obtain the decoded image data.

Such improved computer-implemented techniques increase the efficiency of the encoding and/or compression of image data for an LF 3D display using learning-based intra-prediction techniques exploiting the characteristics of the macropixel image structure inherent to lenslet array captured images. Such techniques may implement macropixel aligned reference block selection, and prediction block decomposition and a neural network-based intra-coding scheme, to maximize the correlation between pixels in the prediction and reference pixel blocks and achieve a high accuracy of regression using divide-and-conquer machine learning techniques.

The apparatuses, systems and methods described herein may convert and/or predict pixel values of a prediction block of the image data in the transform domain, to enable the decoupling of useful information (e.g., frequency content of the prediction block) to facilitate more effective predictions of pixel values of the prediction block. In some embodiments, the system(s) may advantageously implement a separate machine learning model for each component to be predicted, e.g., for each of the direct current (DC) component, low frequency alternating current (AC), and high frequency AC components, to effectively obtain predictions of each component from the corresponding machine learning model on a per-component basis. For example, the improved computer-implemented techniques described herein may achieve 20~30% Bjontegaard rate difference (BD-rate) bitrate reduction as compared to other approaches.

In some embodiments, a size and location of each of the plurality of reference pixel blocks is determined based on an arrangement of the lenslet array of the device and resulting sizes of a plurality of macropixels of the image data.

In some aspects of this disclosure, determining the first component comprises inputting the plurality of reference pixel blocks to a first machine learning model trained to accept as input image data and output a DC discrete cosine transform (DCT) coefficient of a prediction block associated with the input image data. In some embodiments, determining the second component comprises inputting the plurality of reference pixel blocks to a second machine learning model trained to accept as input the image data and output a low frequency AC DCT coefficient. In some aspects of this disclosure, determining the third component comprises inputting the plurality of reference pixel blocks to a third machine learning model trained to accept as input the image data and output a high frequency AC DCT coefficient. Accordingly, the system(s) may advantageously implement a separate machine learning model for each component (e.g., each of the DC, low frequency AC, and high frequency components) to effectively obtain predictions of each component from the corresponding machine learning model on a per-component basis.

A DCT may be performed on a training prediction block of training image data to obtain DCT coefficients. The DCT coefficients may comprise a DC coefficient representing average pixel values of the training prediction block; a low frequency AC coefficient representing low frequency pixel values of the training prediction block; and a high frequency AC coefficient representing high frequency pixel values of the training prediction block. The first machine learning model may be trained using the DC coefficient and a plurality of training reference pixel blocks associated with the training prediction block. The second machine learning model may be trained using the AC low frequency coefficient and the plurality of training reference pixel blocks. The third machine learning model may be trained using the AC high frequency coefficient and the plurality of training reference pixel blocks.

In some aspects of this disclosure, determining the first component further comprises inputting to the first machine learning model one or more values of pixels adjacent to at least one of the plurality of reference pixel blocks.

In some embodiments, determining the first component further comprises inputting to the first machine learning model one or more values of pixels adjacent to the prediction block.

In some aspects of this disclosure, each of the first machine learning model, the second machine learning model and the third machine learning model is a multilayer perceptron (MLP) neural network.

In some embodiments, determining the predicted pixel values further comprises computing an inverse DCT (iDCT) of each of the first component, the second component and the third component In some aspects of this disclosure, the plurality of reference pixel blocks are identified by decoding and reconstructing a portion of a bitstream corresponding to previously encoded portions of the image data.

In some embodiments, encoding the image data based at least in part on the predicted pixel values of the prediction block comprises computing a difference between the predicted pixel values of the prediction block and pixel values of the prediction block, and generating a bitstream comprising an indication of the computed difference. Such bitstream may be transmitted by the system(s), for decoding of the encoded image data, and display of the decoded image data, at a device (e.g., a 3D display device).

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIGS. 5A-5B shows a block diagram of an illustrative system for encoding image data comprising macropixels and illustrative machine learning models, in accordance with some embodiments of this disclosure.

DETAILED DESCRIPTION

Figure 1:
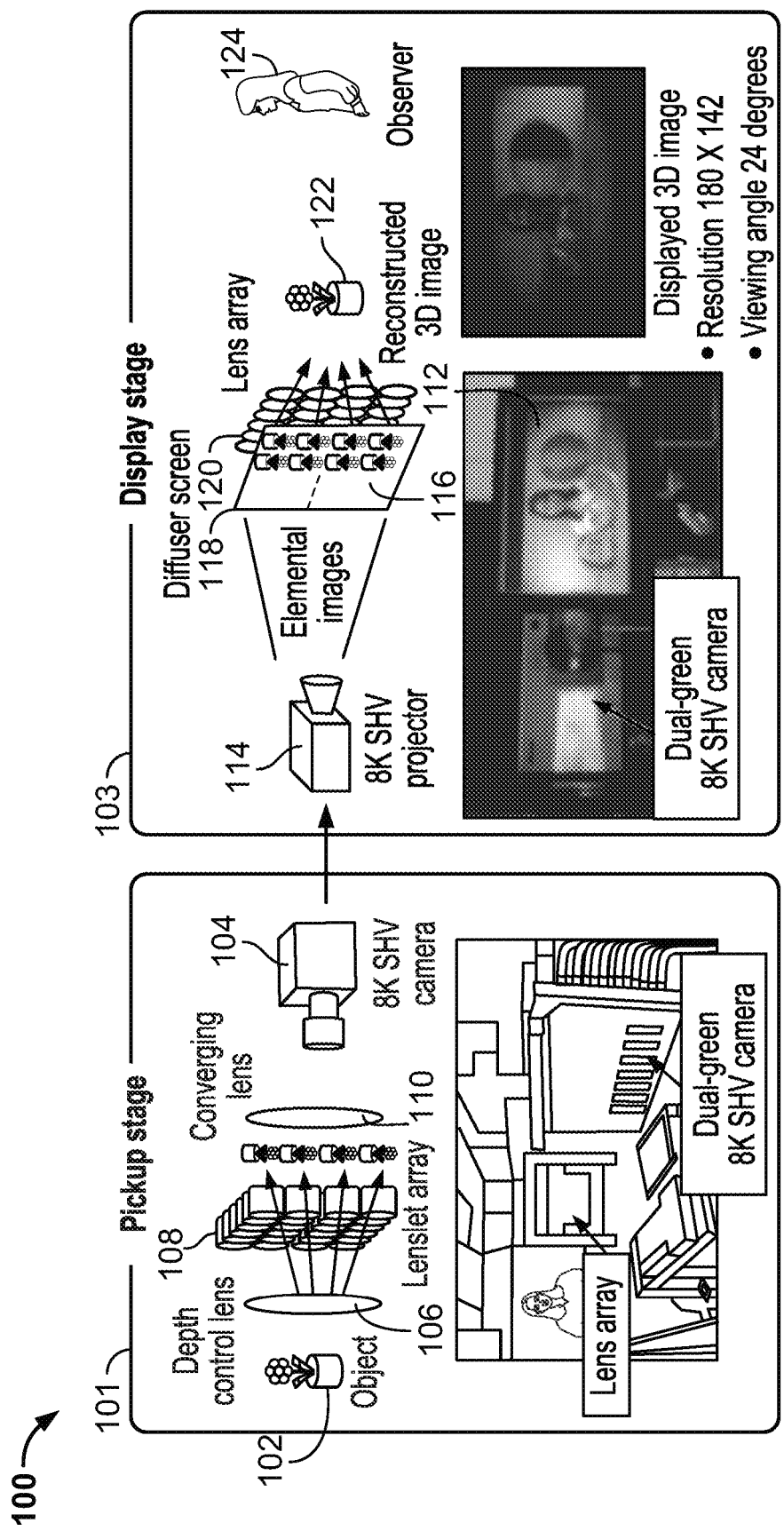
FIG. 1 shows an illustrative 3D display system, in accordance with some embodiments of this disclosure.

FIG. 1 shows an illustrative 3D display system 100, in accordance with some embodiments of this disclosure. 3D display system 100 may comprise pickup stage 101 and display stage 103. In pickup stage 101, a device (e.g., camera 104) may be configured to capture image data comprising one or more objects 102 or any other suitable imagery. Camera 104 may comprise or otherwise be in proximity to any suitable number or types of lenses, e.g., a main lens or depth control lens 106, lenslet array 108 and/or converging lens 110. In some embodiments, lenslet array 108 may be a lenslet or micro lens array, and the captured image data may correspond to light field (LF) lenslet images. LF or plenoptic images may represent a scene as a collection of observations of the scene from different camera positions, often referred to as elemental images 116 or parallax views. Camera 104 may be an 8K Super Hi-Vision (SHV) camera, or any other suitable camera capable of capturing LF image data, or any combination thereof, to enable reconstruction (e.g., by camera 104 and/or 3D display 112 and/or projector 114 and/or any other suitable display or other components) of the captured scene from every angle of the scene.

In some embodiments, LF image data may be captured by a one or more image sensors (e.g., included in camera 104) and lenslet array 108, and/or a 2D camera array may be configured to capture a plurality of different 2D parallax views 116 of a scene, and/or using a camera on a moving gantry. For example, such one or more image sensors may be a CCD or CMOS image sensor, or any other suitable sensor or combination thereof. The lenslet or camera array may correspond to one or more plenoptic content capture devices, or any other suitable content capture devices or cameras, or any combination thereof, which may each comprise internal microlens arrays and image sensors. Plenoptic content capture devices are discussed in more detail in U.S. Pat. No. 9,384,424 issued in the name of Rovi Guides, Inc. on Jul. 5, 2016, the contents of which are hereby incorporated by reference herein in their entirety. In some embodiments, the LF image data may correspond at least in part to synthetic content such as from a 3D model or game engine, and may be rendered with a virtual camera in an array of positions to enable reconstruction of the captured scene from every angle of the scene. In some embodiments, LF imagery or image data may correspond to synthetic aperture image (SAI) views, which may be understood as images from all possible view angles of a particular scene or image. For example, each of the images of the SAI may be a respective full scale image of a particular view angle. The SAI may be comprised of two-dimensional (2D) images.

LF information comprising all light rays or photons propagating from an object to a camera may be captured as image data. Such LF information is four-dimensional, and may be represented by a vector comprising intensity information, spatial positioning information, and directionality and angular information of light rays of the LF. In some embodiments, light rays from a particular portion of the captured scene (e.g., including object 102) may project to a particular portion of lenslet array 108 (e.g., via main lens 106) and/or to corresponding portions or pixels of an image sensor (e.g., positioned behind the lenslet array, such as in camera 104). Such features may enable preserving orientation and direction information of the light rays arriving at the sensor, in addition to color and brightness information, for use in reconstructing the image data at 3D display 112. In some embodiments, each pixel of 3D display 112 may be associated with color and brightness values, and may be configured to be perceived differently in different angular directions, e.g., left, right, up, down, etc., based on the orientation and direction information.

3D display 112, at display stage 103, may be configured to be capable generating for display the received LF image data by reconstructing every possible view and perspective of the content to one or more observers 124. 3D display 112 may be coupled to or otherwise in communication with camera 104 and/or projector 114 and/or any other suitable components to access LF image data. In some embodiments, 3D display 112 may be a tensor display, multi-layer display, LCD display or any other suitable type of display capable of displaying 3D content, or any combination thereof, using any suitable display scheme. In some embodiments, 3D display 112 may be an integral display, or a modular display in which a display is built from modular elements that tile together. In some embodiments, 3D display 112 may comprise diffuser screen 118 and/or lens array 120 and/or any other suitable components, and utilize such components to generate for presentation reconstructed image 122 of object 102 captured by LF camera 104.

In some embodiments, 3D display 112 may be capable of providing a 3D viewing experience to the user with or without the aid of an additional device, e.g., glasses equipped with temporal shutters, polarizers, color filters, or other optical or optoelectronic elements. In some embodiments, 3D display 112 may be configured to display holograms or holographic structures. In some embodiments, 3D display 112 may access image data over any suitable data interface (e.g., HDMI, DisplayPort, or any other suitable interface, or any combination thereof) over which image data may be received, e.g., from memory and/or over a network and/or any other suitable source. 3D display 112 and/or camera 104 and/or any other suitable components may be configured to computationally synthesize views from different angles and different focuses.

LF display 112 may be understood as a display configured such that as the user moves his or her head and/or his or her eyes and/or his or her body to view the LF display from different angles or vantage points, the one or more images provided via the LF display may appear to the user to shift in perspective according to the perception angle of the new vantage point. This may give the user the impression that the object is actually present, thus making the user perceive the image as three-dimensional. For example, a user's perspective may shift if the user physically pans from left to right with respect to 3D display 112, or otherwise modifies his or her viewing location, or if a user manipulates or shifts a device comprising 3D display 112 relative to him- or herself). Such views or perspectives may be 2D, and a plurality of the views may together make up a single frame of a media asset, as discussed in more detail below. In some embodiments, the frame may comprise a plurality of views corresponding to a single instance in time, e.g., captured images of a particular real world scene and/or computer-generated images of a particular scene. In some embodiments, pixel values of LF imagery may be a function of a location of the user and viewing angle of the user.

In some embodiments, the LF information may be used to generate a plurality of views of a particular frame, for use by 3D display 112 to display a particular scene of a media asset, which may comprise any suitable number of frames associated with respective views or perspectives. In some embodiments, the plurality of views may respectively correspond to different perspectives of a scene, e.g., a degree or less apart, or any other suitable degrees of separation between the views may be employed. As referred to herein, the terms "media asset" and "content" may be understood to mean electronically consumable user assets, such as television programming, as well as pay-per-view programs, on-demand programs (as in video-on-demand (VOD) systems), Internet content (e.g., streaming content, downloadable content, Webcasts, etc.), video clips, audio, content information, pictures, GIFs, rotating images, documents, playlists, websites, articles, books, electronic books, blogs, advertisements, chat sessions, social media, applications, games, and/or any other media or multimedia and/or combination of the same. As referred to herein, the term "multimedia" should be understood to mean content that utilizes at least two different content forms described above, for example, text, audio, images, video, or interactivity content forms. Content may be recorded, played, transmitted to, processed, displayed and/or accessed by user equipment devices, and/or can be part of a live performance. In some embodiments, 3D display 112 may be configured to enable a user to modify the focus of different objects depicted in the media asset in a particular scene and/or while the media asset is progressing, e.g., in a foveated display. In some embodiments, each view may be understood as a bitmap, e.g., comprising bits representing values of brightness, color and directionality of light rays associated with the image data of the view.

The 2D views may be horizontal-parallax-only (in which the view perceived by the user only changes as the user's perspective changes from side to side), vertical-parallax-only (in which the view perceived by the user only changes as the user's perspective changes in an upwards or downwards direction), of a full parallax view (in which the view changes as the user's perspective shifts up and down and/or side to side) or any other suitable arrangement may be employed, or any combination thereof. Imagery displayed by 3D display 112 may be generated based on image data (e.g., one or more images and/or video) captured with an image sensor and a lenslet array, or a 2D camera array, or may be a multiview rendering of synthetic content such as from a 3D model (e.g., a CGI model) or game engine rendered with a virtual camera in an array of positions, or may be captured or generated using any other suitable electro-optic or opto-electronic mechanism, or any other suitable methodology, or any combination thereof. Such imagery may facilitate a realistic 3D viewing experience to observer 124 using any suitable number of 2D views.

Figure 2:
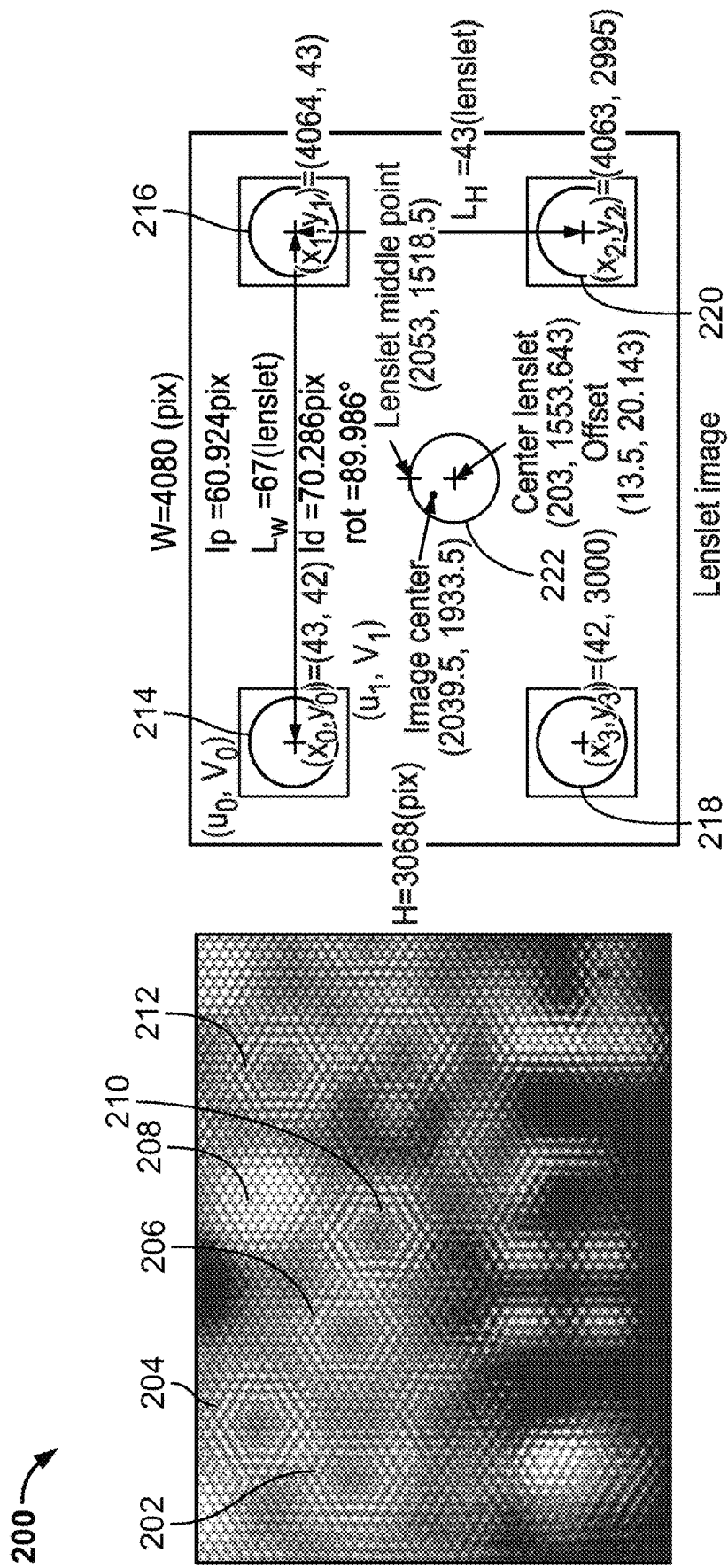
FIG. 2 shows an illustrative lenslet image, in accordance with some embodiments of this disclosure.

FIG. 2 shows an illustrative lenslet image 200, in accordance with some embodiments of this disclosure. In some embodiments, a lenslet image may be captured and generated by a lenslet plenoptic camera (e.g., camera 104 of FIG. 1 and/or any other suitable components of 3D display system 100 of FIG. 1) capable of capturing and generating parallel LF image data for presentation at 3D display 112. For example, lenslet array 108 may comprise a set of Lw×Lh lenslets or microlenses placed behind main lens 106 (e.g., positioned in between main lens 106 and an image sensor) to capture incoming light rays in a lenslet format comprising any suitable number of macropixels, e.g., 202, 204, 206, 208, 210, 212, etc. Such light rays converge on different portions of lenslet array 108 and diverge to corresponding portions of the image sensor for output as macropixels, e.g., a group of pixels. Such macropixels may have approximate sizes of (W/Lw) by (H/Lh) for a sensor size (e.g., an image sensor within camera 104) of W×H pixels, to enable diverse angular views of a scene to be captured and enable post-processing of image data, e.g., re-focusing. In some embodiments, at least a portion of the macropixels of lenslet image 200 may have a hexagonal form or any other suitable shape, as shown in the left-hand portion of FIG. 2, and may comprise or otherwise indicate LF information for the micropixel. It should be noted that the 67×43 lenslet configuration shown in FIG. 2 is merely illustrative, and any suitable lenslet arrangement may be employed.

The optical structure and architecture of the lenslet arrangement may determine the size of the macropixels. In some embodiments, a manufacturer of lenslet camera 104 may specify or calibrate various coordinates for the lenslet and/or lenslet image, e.g., center coordinates 214 ($x_0$, $y_0$) of a top left portion, center coordinates 216 ($x_1$, $y_1$) of a top right portion, center coordinates 218 ($x_3$, $y_3$) of a lower left portion, center coordinates 220 ($x_2$, $y_2$) of a lower right portion, and coordinates 222 (e.g., image center, lenslet middle point, center lenslet and offset). Micropixel characteristics (e.g., a size of 60.9×70.2 pixels, or any other suitable size or location or any other suitable characteristics) may be determined or computed based on such coordinates and/or other parameters. Such coordinates and/or other parameters and/or micropixel characteristics may be stored or otherwise accessed by, e.g., server 704, 3D display device 715, media content source 702 of FIG. 7, any suitable portion of system 100, and/or any other suitable device.

Figure 3:
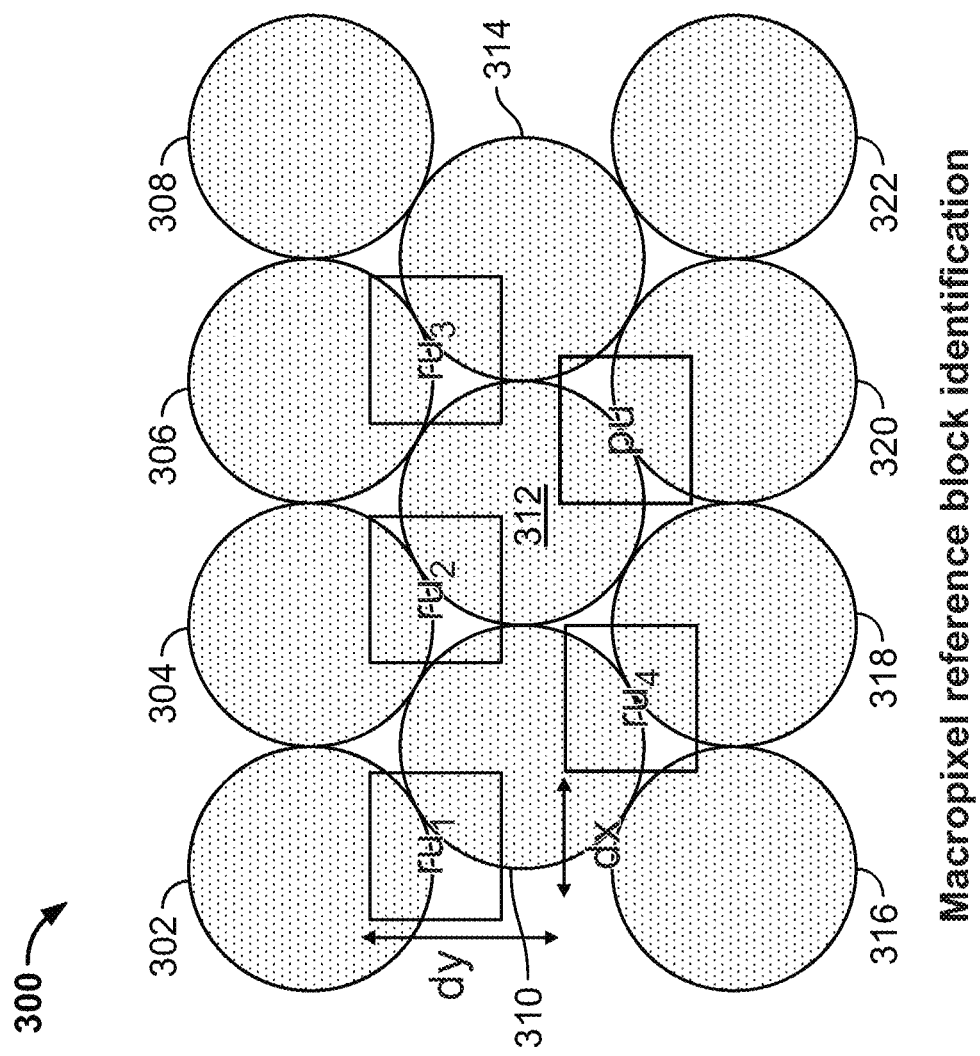
FIG. 3 shows illustrative reference pixel blocks and prediction blocks within image data comprising micropixels, in accordance with some embodiments of this disclosure.

FIG. 3 shows illustrative reference pixel blocks and prediction blocks within image data comprising micropixels, in accordance with some embodiments of this disclosure. Image data 300 may comprise macropixels 302, 304, 306, 308, 310, 312, 314, 316, 318, 320, 322 or any other suitable number of macropixels of any suitable size or shape. The apparatuses, systems and methods provided for herein may implement an image data processing system (e.g., implemented at one or more of media content source 702, server 704, database 705, or 3D display device 715 of FIG. 7, or any combination thereof, or distributed across one or more of any other suitable computational resources, or any combination thereof). The image data processing system may be configured to determine a plurality of reference pixel blocks $ru_1$, $ru_2$, $ru_3$, $ru_4$, or any other suitable number of reference pixel blocks, and prediction block pu, of image data 300, using any suitable technique. The prediction block pu, which may also be referred to as a prediction pixel block pu or prediction unit pu, may be understood as a block of pixels to be predicted, and/or encoded based, at least in part, on spatial or temporal neighbors. Reference pixel blocks $ru_1$, $ru_2$, $ru_3$, $ru_4$, which may also be referred to as a reference pixel block or a reference unit, may be understood as a block of pixels that are already-encoded and which may be decoded and reconstructed from a bitstream to be utilized in prediction). In some embodiments, the image data processing system may be configured to partition image data 300 into such blocks or units, and such blocks may be understood as any suitable region or subset of image data 300 (e.g., a tile, a slice, a macroblock, a coding unit, etc.). In some embodiments, image data 300 may correspond to a particular frame of a media asset to be provided to a light field display or other 3D display, where such frame includes spatial and angular information for a plurality of different perspectives or viewing angles. For example, each of reference pixel blocks $ru_1$, $ru_2$, $ru_3$, $ru_4$ and prediction block pu may be included in a single frame of a media asset (e.g., and encoded using intra-prediction techniques) or may be included in different frames of a media asset (e.g., and encoded using inter-prediction techniques).

Each of prediction block pu and reference pixel blocks $ru_1$, $ru_2$, $ru_3$, $ru_4$, may be square, rectangular or of any other suitable shape and size or any combination thereof. In some embodiments, prediction block pu and/or reference pixel blocks $ru_1$, $ru_2$, $ru_3$, $ru_4$ may be configured to be of pixel size N×N (e.g., where N=8, 16, 32 or 64 or any other suitable size). In some embodiments, the image data processing system may configure prediction block pu and/or reference pixel blocks $ru_1$, $ru_2$, $ru_3$, $ru_4$ to have dimensions N×M (e.g., 8×16, 16×32, etc.). In some embodiments, the image data processing system may identify a location and/or size of prediction block pu based on determining that pixels of prediction block pu are in a predefined vicinity of, and/or have similar pixel characteristics to, reference pixel blocks $ru_1$, $ru_2$, $ru_3$, $ru_4$. In some embodiments, each of reference pixel blocks $ru_1$, $ru_2$, $ru_3$, $ru_4$ may be of the same size and may be identified at the offset of (dx, dy) pixels, where dx and dy may be determined by the lenslet sensor set up and resulting macropixel size of (h, w), as shown below:

$$dy = \left\lceil \frac{N}{h} \right\rceil \times h$$

$$dx = \begin{cases} w/2, & \lceil N/h \rceil \in \text{Odd} \\ 0, & \lceil N/h \rceil \in \text{Even} \end{cases}$$

In some embodiments, a horizontal shift of a reference pixel block may be zero when the reference pixel block is positioned at a row having an even number of macropixels. On the other hand, a horizontal shift of a reference pixel block may be w/2 when the reference pixel block is positioned at a row having an odd number of macropixels. In some embodiments, the image data processing system may determine a location and/or size of each of reference pixel blocks $ru_1$, $ru_2$, $ru_3$, $ru_4$ based on an arrangement or structure of the lenslet array 108, as discussed in FIG. 2, e.g., to span across certain portions of multiple macropixels or within a micropixel, the sizes of which may be specified by the camera manufacturer. In some embodiments, the image data processing system may determine that reference pixel blocks $ru_1$, $ru_2$, $ru_3$, $ru_4$ (and/or prediction block pu) should correspond to locations within a predefined vicinity of each other and/or side-by-side and/or adjacent and/or nearby or collocated in a particular localized relationship to each other. In some embodiments, macropixel aligned reference block identification may be performed via boundary matching to help identify better correlated pixel blocks for reference in prediction.

Figure 4:
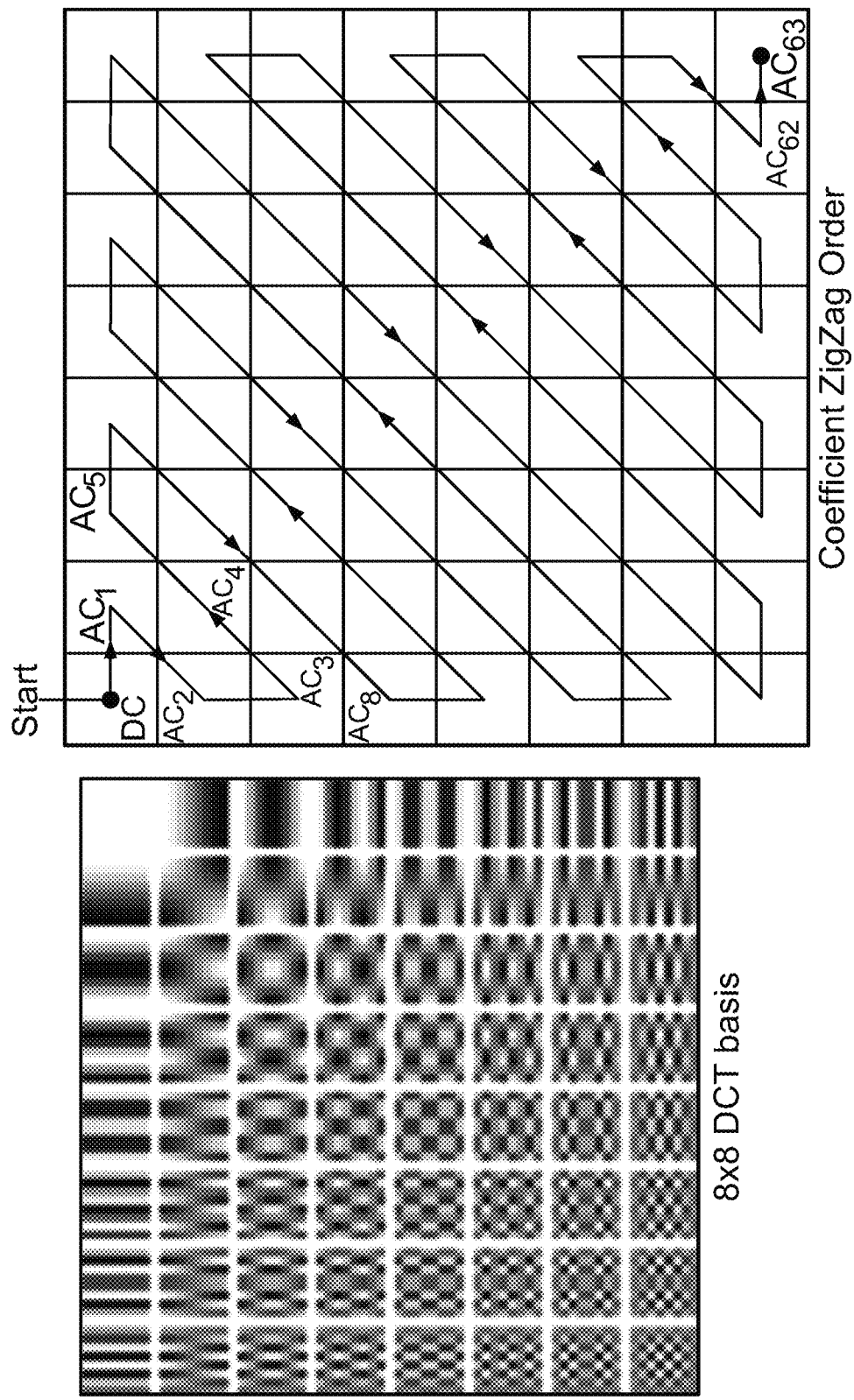
FIG. 4 shows an output of a decomposition technique, in accordance with some embodiments of this disclosure.

FIG. 4 shows an output of a decomposition technique, in accordance with some embodiments of this disclosure. To encode the pixels of prediction block pu, instead of directly signaling pixel values thereof, the image data processing system may employ a prediction scheme comprising decomposition techniques and machine learning techniques. For example, the image data processing system may employ any suitable technique to determine a spatial frequency content of prediction block pu, e.g., decompose prediction block pu via N-point 2D discrete cosine transform (DCT). Additionally or alternatively, the image data processing system may decompose prediction block pu using any other suitable technique, e.g., DCT, Discrete Fourier Transform (DFT), Fast Fourier Transform (FFT), Cosine Transform (CT), Wavelet Transform (WT), Short Time Fourier Transform (STFT) or any other suitable digital signal processing algorithm or technique, or any combination thereof. The decomposition operation may be performed on individual pixels, and/or any suitable portions, of prediction block pu and/or on prediction block pu as a whole, e.g., the frequency may be measured in radians per pixel in the spatial dimension.

From such decomposition operation, the image data processing system may obtain components, e.g., frequency coefficients, of the prediction block pu. For example, the image data processing system may determine one or more direct current (DC) coefficients representing a time average of pixel values of prediction block pu. The image data processing system may further obtain alternating current (AC) coefficients representing relatively higher or relatively lower frequencies associated with particular pixel values of prediction block pu. The prediction block pu may be organized into bands comprising DC, low frequency AC and high frequency AC bands. For example, as shown at the right-hand portion of FIG. 4, for an N×N prediction unit pu the decomposition may yield 1 DC coefficient (e.g., representing an average of one or more characteristics of pixels of the prediction unit pu), low frequency coefficients $AC_1$ through $AC_{N^2/4}$ and high frequency coefficients $$AC\frac{N^2}{4}+1$$

through $AC_{N^2-1}$. For example, for an 8×8 prediction unit pu (e.g., 64 pixels to be predicted), the components may comprise 1 DC coefficient and 63 AC coefficients, where $AC_1$-$AC_{16}$ may represent low frequency coefficients and $AC_{17}$-$AC_{63}$ may represent high frequency coefficients. The low frequency coefficients may indicate gradual or low frequency change of characteristics within prediction block pu or a portion thereof, and the high frequency coefficients may indicate rapid or high frequency change of characteristics within prediction block pu or a portion thereof. In some embodiments, the characterization of a particular coefficient as high frequency or low frequency may depend on whether the coefficient exceeds a particular threshold, and such threshold may vary based on the size of the prediction block pu. The left-hand portion of FIG. 4 represents blocks of various frequencies to be weighted by the obtained coefficients (e.g., to quantify the contribution of the block's pattern to the characteristics of prediction block pu).

Such decomposition may be performed on any suitable number and types of prediction blocks.

FIGS. 5A-5B shows a block diagram of an illustrative system for encoding image data comprising macropixels and illustrative machine learning models, in accordance with some embodiments of this disclosure. The image data processing system may implement any suitable set of computer-implemented instructions for predicting pixel values of prediction block pu. Such prediction may be based on the DC DCT coefficient representing average pixel values of prediction block pu, one or more AC DCT coefficients representing low frequency pixel values of prediction block pu, and one or more AC DCT coefficients representing high frequency pixel values of prediction block pu. In utilizing such DC component and low frequency and high frequency AC components, the image data processing system may implement one or more of any suitable type, or different types, of machine learning models and/or any other suitable algorithms. For example, the image data processing system may implement machine learning model 502, machine learning model 504 and machine learning model 506, as shown in FIG. 5A. In some embodiments, each of machine learning model 502, 504 and 506 may be a multi-layer perceptron (MLP) artificial neural network, a recurrent neural network, any other suitable model, or any combination thereof.

Machine learning models 502, 504 and 506 may be trained to predict a DC component, a low frequency component, and a high frequency component, respectively, of a prediction block pu. For example, reference blocks $ru_1$, $ru_2$, $ru_3$, $ru_4$ may be input to each of models 502, 504 and 506, which may be trained to respectively output predictions of components (e.g., model 502 may be trained to output a band corresponding to a DC coefficient, model 504 may be trained to output a band corresponding to a low frequency coefficient, and model 5026 may be trained to output a band corresponding to a high frequency coefficient, of the DCT transform) of prediction block pu associated with $ru_1$, $ru_2$, $ru_3$, $ru_4$ in image data 300. The reference pixel blocks $ru_1$, $ru_2$, $ru_3$, $ru_4$ may be concatenated and input to the machine learning models as a vector having any suitable number of dimensions, indicating spatial domain characteristics, e.g., pixel values, and the outputs may be provided in sequence.

Model 502 may be trained with a training image data set comprising any suitable number of training data points, each comprising, for a particular training prediction block of a lenslet image, a corresponding DC DCT coefficient, and reference pixel block values corresponding to the particular training prediction block. Model 504 may be trained with a training data set comprising any suitable number of training data points, each comprising, for a particular prediction block of a lenslet image, corresponding low frequency AC DCT coefficient(s), and reference pixel block values corresponding to the particular training prediction block. Model 506 may be trained with a training data set comprising any suitable number of training data points, each comprising, for a particular training prediction block of a lenslet image, corresponding high frequency AC DCT coefficient(s), and reference pixel block values corresponding to the particular training prediction block. In some embodiments, the decomposition of such training data into frequency components of a prediction block may allow for much smaller dynamic range signals to be effectively regressed by their own respective MLP network. Models 502, 504 and 506 and their respective associated parameters and settings may be stored and executed by the image data processing system locally (e.g., at 3D display 112) and/or at one or more remote devices (e.g., server 704 and/or media content source 702). Training datasets (e.g., lenslet images and associated labels and/or metadata) used to train models 502, 504 and 506 may be stored locally (e.g., at 3D display 112) and/or at one or more remote devices (e.g., server 704 and/or media content source 702).

Once the trained models 502, 504 and 506 output a DC component, a low frequency AC component, and a high frequency component, respectively, for a particular prediction block, the image data processing system may perform (at 508) an inverse discrete cosine transform (iDCT) operation on each of the DC component, the low frequency AC component, and the high frequency AC component. In some embodiments, the image data processing system may organize such predicted DC component, low frequency AC component, and high frequency AC component for prediction block pu into the zigzag structure of FIG. 4 to facilitate performing such iDCT operation. As shown in FIG. 5A, the iDCT operation may result in obtaining reconstructed prediction block 510 in the pixel domain, e.g., predicted pixel values of prediction block pu based on the DCT coefficients output by models 502, 504 and 506. The image data processing system may compute a difference between the predicted pixel values of the reconstructed prediction block 510 value and ground truth pixel values 512 of prediction block pu (e.g., indicated in metadata associated with the image data or otherwise determined by the image data processing system) to obtain residual 514. Residual 514 may be populated in a bitstream (e.g., generated by the image data processing system) representing the encoded image data. The number of bits required to represent residual 514 may be significantly fewer than the number of bits required to signal each of the pixel values of prediction unit pu. For example, all of the pixel values for prediction value pu need not be transmitted or stored, thereby conserving storage and/or network resources for transmitting the image data. For example, residual 514 may be zero or close to zero, e.g., after a quantization operation is performed. In some embodiments, the bitstream comprising the indication of residual 514 may comprise an indication of the position and/or size (e.g., dy and dx) of reference pixel blocks $ru_1$, $ru_2$, $ru_3$, $ru_4$ within the image data.

In some embodiments, any suitable number of additional processing steps may be performed on residual 514 prior to its insertion in the bitstream comprising the encoded image data. For example, once residual 514 is obtained, a DCT operation may be performed on residual 514 to obtain a DC DCT coefficient, low frequency AC DCT coefficients, and high frequency AC DCT coefficients of residual 514. In some embodiments, the image processing system may employ quantization technique(s), and/or other suitable technique(s), to facilitate removal of high frequency coefficients from the transform representation of residual 514, where such high frequency coefficients may have minimal impact on the overall image as opposed to the low frequency coefficients of residual 514, which may be more representative of the image. The obtained coefficients may be efficiently ordered in a zig-zag scan (FIG. 4), to enable vectorization of the coefficients to prioritize the importance of lower frequency coefficients in the sequence and facilitate removal of high frequency coefficients as part of the encoding and/or compression process. Such removal of coefficients may enable prediction block pu, and/or other portions of the image data, to be represented with significantly fewer bits for storage and transmission, while preserving the fidelity of the image data from the perspective of consumers of a media asset comprising the image data. In the zig-zag scan, the coefficients may be ordered from the DC component to AC components of increasing frequency. In some embodiments, the image data processing system may be configured to only store and/or transmit DCT coefficients of residual 514 containing significant amounts of energy, e.g., the lower frequency coefficients.

In some embodiments, the image data processing system may perform further encoding of the quantized coefficients of residual 514, e.g., Huffman coding or other entropy encoding and/or any other suitable encoding techniques. Such further encoded quantized coefficients of residual 514 may be inserted into the bitstream representing the encoded image data along with any other suitable information to help facilitate decoding. For example, the bitstream may include an identifier or other indicator of a location, e.g., coordinates of reference blocks $ru_1$, $ru_2$, $ru_3$, $ru_4$ within the encoded image data, which may indicate an offset from coordinates of prediction block pu, e.g., as part of a motion vector. In some embodiments, the bitstream may include an indication of a particular frame number of a media asset that the reference pixel blocks and/or prediction blocks correspond to, and/or macropixel information related to a lenslet device used to capture the image data. The image data processing system may cause the bitstream corresponding to the encoded image data to be stored and/or transmitted to a 3D display device (e.g., 3D display device 715 of FIG. 7) for decoding of the encoded image data and subsequent display of the decoded image data. A decoder (e.g., decoder 718 or any other suitable decoder) may decode the encoded image data by locating such reference pixel blocks within the encoded image data based on the specified coordinates in the bitstream, and applying (e.g., adding) the residual value specified in the bitstream to the reference pixel blocks to obtain the decoded image data including the decoded representation of prediction block pu.

In addition to pixels inside reference pixel block(s) (e.g., $ru_1$, $ru_2$, $ru_3$, $ru_4$ each of N×N dimensions), pixels adjacent or otherwise in a vicinity of a boundary of a top row of each reference pixel block, and pixels adjacent or otherwise in a vicinity of a boundary of a left column of each reference pixel block, may be highly corrected with pixels of prediction unit pu. For example, such pixels may be understood as fringe features F comprising 2N+1 pixels (e.g., in an immediate neighborhood of one or more of the reference pixel blocks and/or pu), and may be input to machine learning model 502 and/or any other suitable model. In some embodiments, the fringe features F may additionally or alternatively correspond to pixels adjacent or otherwise in a vicinity of a boundary of a top row of prediction pixel block pu, and pixels adjacent or otherwise in a vicinity of a boundary of a left column of prediction pixel block pu. For example, the fringe features F may have already been encoded and part of a bitstream, which can be decoded to obtain the pixel values of fringe features F, and may be used for predicting pixel values of prediction block pu. Similarly, the reference pixel blocks may have already been encoded and may be decoded for the purposes of predicting prediction block pu. The image data processing system can exploit, and the models can learn patterns indicating, that reference pixel blocks may be more predictive of pixels further from a top left corner of prediction block pu, whereas the pixels closer to the top left corner of prediction block pu may be more predictive based on the fringe features F. Each of models 502, 504 and 506 may have any suitable number and types of inputs and outputs and any suitable number and types of layers (e.g., input, output, and hidden layer(s)). An illustrative, non-limiting implementation of models 502, 504 and 506 is detailed in Table 1 below (and in FIG. 5B), in which each model may comprise two hidden layers:

TABLE 1

| Network Type | Input Layer | Hidden Layer 1 | Hidden Layer 2 | Output Layer |
| --- | --- | --- | --- | --- |
| MLP_DC | $\{F, ru_1, ru_2, ru_3, ru_4\}$ $N_{input} = 4(2N+1) + 4N^2$ pixels | 512 nodes | 256 nodes | 1 node for DC(PU) $N_{output} = 1$ |
| MLP_AC1 | $\{ru_1, ru_2, ru_3, ru_4\}$ $N_{input} = 4N^2$ pixels | 256 nodes | 256 nodes | $N^2/4$ node for low frequency ACs $N_{output} = N^2/4$ |
| MLP_AC2 | $\{ru_1, ru_2, ru_3, ru_4\}$ $N_{input} = 4N^2$ pixels | 256 nodes | 256 nodes | $N^2 - N^2/4$ node for high frequency ACs $N_{output} = N^2 - N^2/4 - 1$ |

As shown, the MLP_DC model 502 may have more nodes in hidden layer 1 than MLP_AC1 model 504 and MLP_AC2 model 506, since the DC component may carry more information. In some embodiments, for an 8×8 prediction block pu (and reference pixel blocks of the same size), the MLP_DC output may be one dimension, the MLP_AC1 output may be 16 dimensions, and the MLP_AC2 output may be 47 dimensions.

As discussed, the image data processing system may be configured to implement macropixel aligned reference unit identification for improved pu and ru correlation, and the DCT decomposed pu enables a divide-and-conquer prediction strategy. The decoupling of the high frequency part from lower frequency and DC targets, as performed by the image data processing system, enables the network not to suffer any lessening of prediction efficiency from high frequency losses not perceptible to users consuming a media asset comprising the image data. In some embodiments, the aspects of the present disclosure may be incorporated into relevant standards for LF compression and/or encoding.

The image data processing system may be configured to encode and/or compress the input lenslet image data, e.g., including the prediction block pu pixel values, as determined in FIG. 5A. Such encoded pixel representations may be stored and/or transmitted, via a bitstream, for display at a 3D display device. Such receiving 3D display device decodes the received image data and generates content for display, based on the decoded image data corresponding to the pixel representations of the input lenslet image data, to facilitate an LF user experience of a media asset for one or more users, e.g., as part of 3D display system 100 of FIG. 1. In some embodiments, the image data processing system may be configured to output residual 514 to another suitable computing resource (e.g., a Versatile Video Coding (VVC) encoder, or any other suitable encoding tool, or any combination thereof) to perform encoding.

Models 502, 504 and 506 may be trained with any suitable amount of training image data, e.g., various lenslet images from any suitable number and types of sources, including reference pixel blocks from such lenslet images and DCT coefficients (and ground truth pixel values of the prediction block) of a prediction block of the lenslet image. Model 502 may be trained to learn patterns with respect to correlating particular DC DCT coefficients with certain combinations of reference pixels and prediction block pixels. Model 504 may be trained to learn patterns with respect to correlating particular low frequency AC DCT coefficients with certain combinations of reference pixels and prediction block pixels. Model 506 may be trained to learn patterns with respect to correlating particular high frequency AC DCT coefficients with certain combinations of reference pixels and prediction block pixels.

The image data processing system may perform any suitable pre-processing steps with respect to training image data, and/or image data to be input to the trained machine learning model (e.g., extracting suitable features from the training lenslet images, converting the features into a suitable numerical representation (e.g., one or more vector(s) and/or one or more matrices) normalization, resizing, minimization, brightening the image or portions thereof, darkening the image or portions thereof, color shifting the image among color schemes, from color to grayscale, or other mapping, cropping the image, scaling the image, adjusting an aspect ratio of the image, adjusting contrast of an image, and/or performing any other suitable operating on or manipulating of the image data, or any combination thereof). In some embodiments, the image data processing system may pre-process image data to be input to the trained machine learning model, to cause a format of the input image data to match the formatting of the training data, or any other suitable processing, or any combination thereof.

In some embodiments, machine learning models 502, 504 and 506 may be trained by way of unsupervised learning, e.g., to recognize and learn patterns based on unlabeled data. Additionally or alternatively, models 502, 504 and 506 may be supervised and trained with labeled training examples to help each model converge to an acceptable error range, e.g., to refine parameters, such as weights and/or bias values and/or other internal model logic, to minimize a loss function. In some embodiments, each layer may comprise one or more nodes that may be associated with learned parameters (e.g., weights and/or biases), and/or connections between nodes may represent parameters (e.g., weights and/or biases) learned during training (e.g., using backpropagation techniques, and/or any other suitable techniques). In some embodiments, the nature of the connections may enable or inhibit certain nodes of the network. In some embodiments, the image data processing system may be configured to receive (e.g., prior to training) user specification of (or automatic selection of) hyperparameters (e.g., a number of layers and/or nodes or neurons in each model). The image data processing system may automatically set or receive manual selection of a learning rate, e.g., indicating how quickly parameters should be adjusted. The training image data may be suitably formatted and/or labeled (e.g., with identifies of various attributes and/or pixel values for the reference pixel blocks and/or prediction pixel blocks and/or DCT coefficients, by human annotators or editors or otherwise labeled via a computer-implemented process). As an example, such labels may be categorized metadata attributes stored in conjunction with or appended to the training image data. Models 502, 504 and 506 may be trained with such training datasets during any suitable number of training cycles. Any suitable network training patch size and batch size may be employed.

Each of machine learning models 502, 504 and 506 may receive as input a vector, or any other suitable numerical representation, representing feature embeddings, and process such input. Models 502, 504 and 506 may be trained to learn features and patterns regarding characteristics of particular input reference pixel blocks and corresponding DCT coefficients (e.g., DC components for model 502; low frequency AC components for model 504; high frequency AC components for model 506) of a prediction block associated with the input reference blocks. Such learned inferences and patterns may be applied to received data once each of model 502, 504 and 506 is trained. In some embodiments, each of models 502, 504 and 506 is trained at an initial training stage, e.g., offline. In some embodiments, each of models 502, 504 and 506 may continue to be trained on the fly or may be adjusted on the fly for continuous improvement, based on input data and inferences or patterns drawn from the input data, and/or based on comparisons after a particular number of cycles. In some embodiments, each of models 502, 504 and 506 may be content independent or content dependent, e.g., may continuously improve with respect to certain types of content.

In some embodiments, the image data processing system may access the image data by receiving the image data over a network (e.g., communication network 706 of FIG. 7 or any other suitable network) from any suitable source (e.g., media content source 702 and/or server 704, or any other suitable data source, or any combination thereof). In some embodiments, the image data processing system may generate the image data, and/or retrieve the image data from memory (e.g., memory or storage 726 or storage 714 or database 705, or any other suitable data store, or any combination thereof) and/or receive the image data over any suitable data interface. In some embodiments, the image data processing system may be configured to access, and/or perform processing on, output or transmit, the image data in response to receiving a user input or a user request, e.g., via user input interface 610 of FIG. 6 and/or I/O circuitry of 3D display device 715 of FIG. 7. In some embodiments, the accessed image data may be in raw form, e.g., as received at server 704 of FIG. 7 or media content source 702 of FIG. 7.

In some embodiments, the image data processing system may perform any suitable processing or pre-processing of the DCT coefficients output by models 502, 504 and 506, reconstructed prediction block 510 and/or the computed residual 514. For example, the image data processing system may be configured to perform compression and/or encoding and/or bit reduction techniques on digital bits of the image data in order to reduce the amount of storage space required to store the image data. Such techniques may reduce the bandwidth or network resources required to transmit the image data over a network or other suitable wireless or wired communication medium and/or enable bit rate savings with respect to downloading or uploading the image data. Such techniques may encode the image data such that the encoded image data may be represented with fewer digital bits than the original representation while minimizing the impact of the encoding or compression on the quality of the video or one or more images.

In some embodiments, such techniques may compress or encode the image data by exploiting the observation that adjacent or nearby portions of the reference pixel blocks and prediction block may have a significant amount of redundancy with respect to each other, e.g., as part of a same elemental image of a particular timepoint. Additionally or alternatively, such encoding techniques may compress the image data to be transmitted to 3D display 112 by exploiting the fact that temporally sequential or nearby frames of the image data may have a significant amount of redundancy with respect to each other. In some embodiments, in performing the encoding, the image data processing system may take into account an appropriate format of the image data for a particular target device (e.g., a particular type of device and/or of a particular platform or operating system) that is to receive the data, e.g., different versions of the image data may be stored or transcoded on the fly for different types of client devices.

In some embodiments, the image data processing system may be configured to generate a group of pictures (GOP). A GOP may be understood as a set of pixel block representations at a particular point in time, coded together as a group. Such generating of one or more GOPs may be considered to be part of a process of encoding the image data, or may be considered to be part of a pre-processing step to encoding of the image data. A particular media asset may comprise a plurality of GOPs, each corresponding to a different timepoint within the media asset and/or within the duration of the media asset. For example, each GOP may advance one timepoint with respect to the previous GOP. Each GOP may contain any suitable number of pixel block representations. The images in a GOP may be encoded using any suitable technique, e.g., differential or predictive encoding, or any other suitable technique or combination thereof.

In some embodiments, the GOP may include any suitable number of key and predictive portions, where a key portion may be an I-portion or intra-coded portion that represents a fixed image that is independent of other portions. Predictive portions such as P-portions and B-portions or bi-directionally predictive portions may be employed, which may contain different information indicating distinctions from the reference portion such as the I-portion or another predictive portion. The image data processing system may predict or detect that adjacent or nearby portions within the generated GOP have or may have significant redundancies and similarities across their respective pixel data, and may employ compression and/or encoding techniques that only encodes a delta or change of the predictive portions with respect to an I-portions. Such spatial similarities as between portions of the GOP may be exploited to enable certain portions within a GOP to be represented with fewer bits than their original representations, to thereby conserve storage space needed to store the image data and/or network resources needed to transmit the image data.

Figure 6:
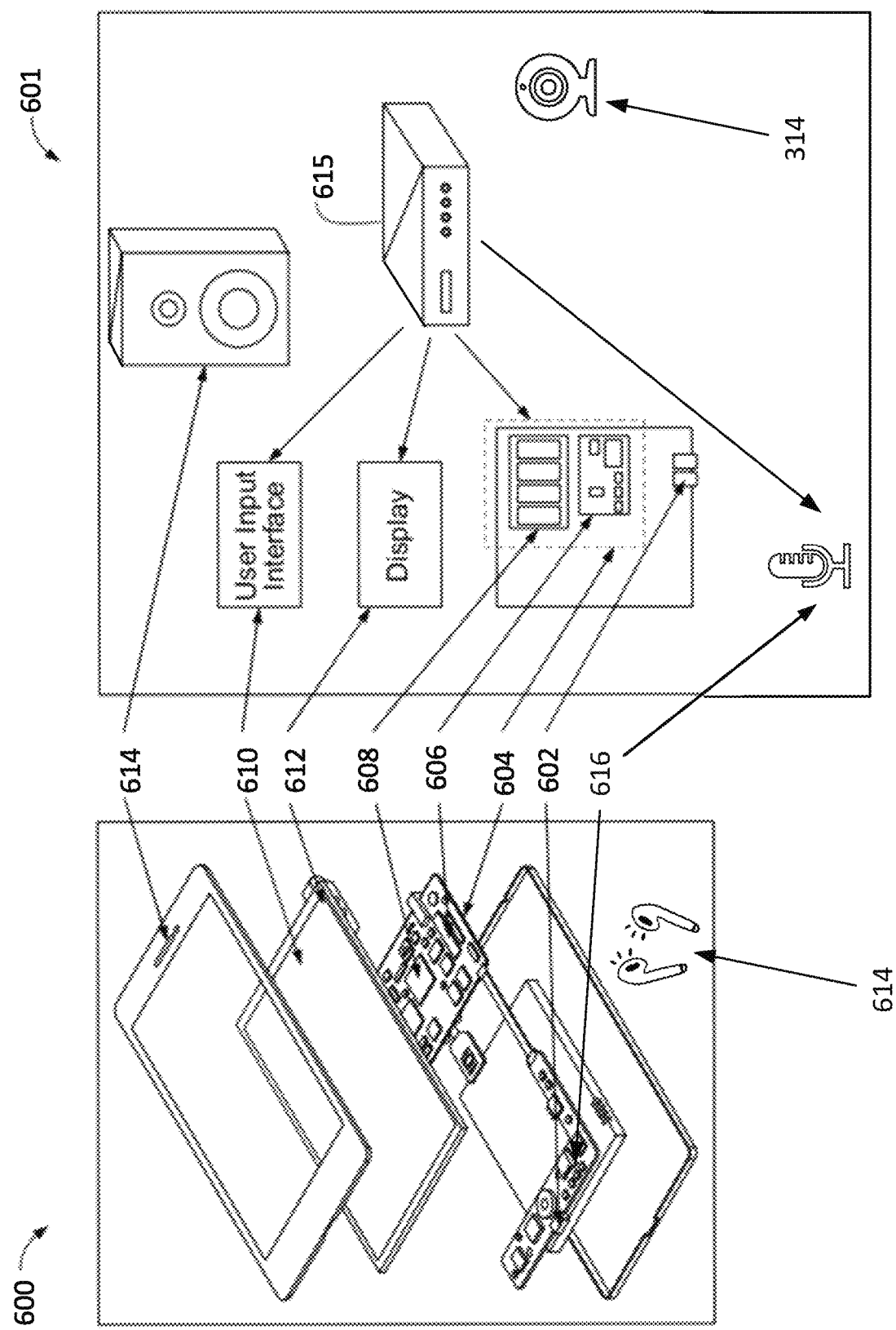
FIGS. 6-7 show illustrative devices and systems for encoding image data for a 3D display, in accordance with some embodiments of this disclosure.
Figure 7:
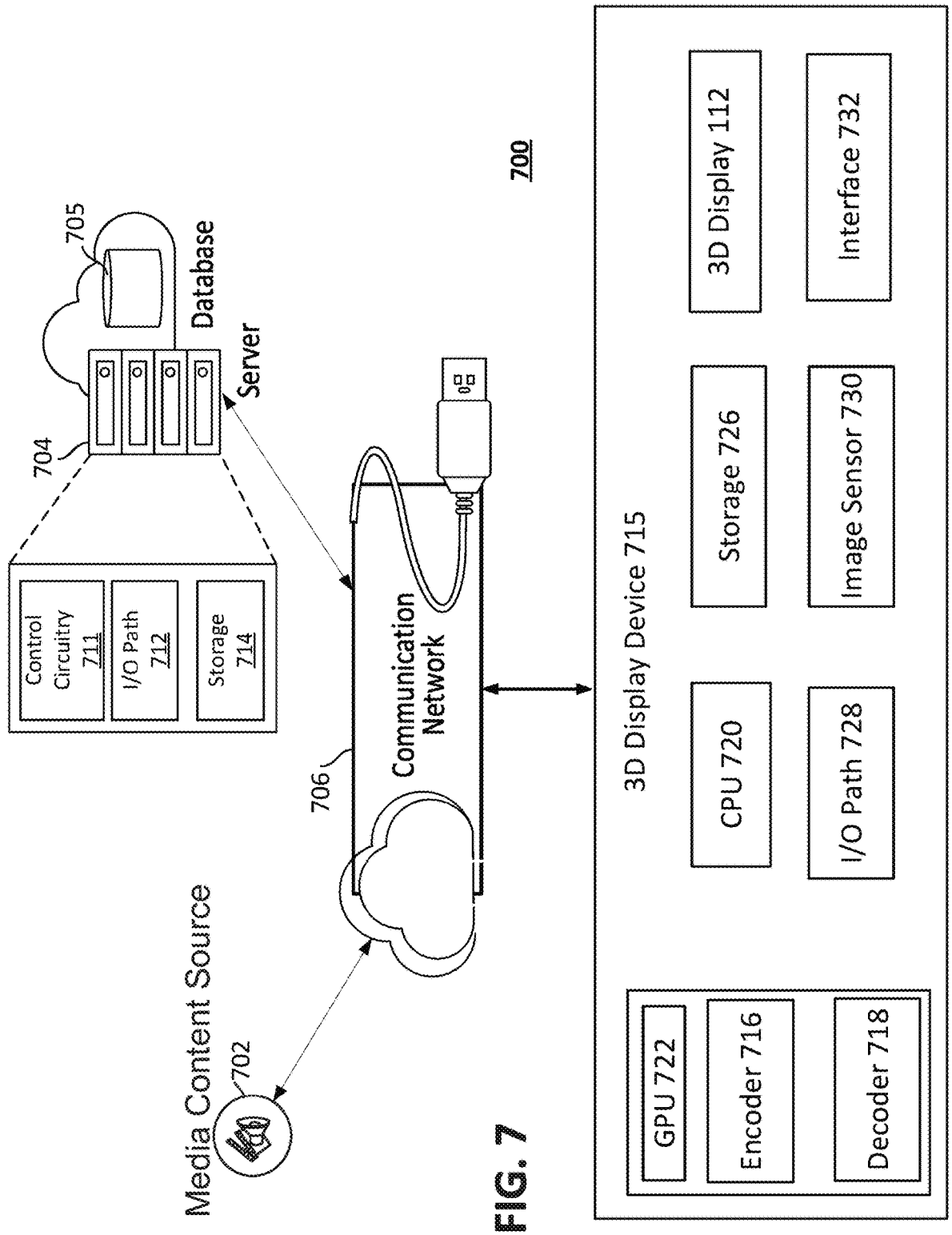

FIGS. 6-7 describe illustrative devices, systems, servers, and related hardware for encoding image data for a 3D display, in accordance with some embodiments of this disclosure. FIG. 6 shows generalized embodiments of illustrative user equipment devices 600 and 601, which may correspond to and/or include, e.g., 3D display 112 of FIG. 1, or any other suitable device, or any combination thereof. For example, user equipment device 600 may be a smartphone device, a tablet, smart glasses, a virtual reality or augmented reality device, or any other suitable device capable of generating for display, and/or displaying, and/or enabling a user to consume, media assets, and capable of transmitting and receiving data, e.g., over a communication network. In another example, user equipment device 601 may be a user television equipment system or device. User television equipment device 601 may include set-top box 615. Set-top box 615 may be communicatively connected to microphone 616, audio output equipment (e.g., speaker or headphones 614), and display 612. Display 612 may correspond to 3D display of FIG. 1. In some embodiments, microphone 616 may receive audio corresponding to a voice of a user, e.g., a voice command. In some embodiments, display 612 may be a television display or a computer display.

In some embodiments, set-top box 615 may be communicatively connected to user input interface 610. In some embodiments, user input interface 610 may be a remote control device. Set-top box 615 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of user equipment devices are discussed below in connection with FIG. 6. In some embodiments, device 600 and/or device 601 may comprise any suitable number of sensors, as well as a GPS module (e.g., in communication with one or more servers and/or cell towers and/or satellites) to ascertain a location of device 600.

Each one of user equipment device 600 and user equipment device 601 may receive content and data via input/output (I/O) path 602. I/O path 602 may provide content (e.g., broadcast programming, on-demand programming, Internet content, content available over a local area network (LAN) or wide area network (WAN), 3D content, LF content, and/or other content) and data to control circuitry 604, which may comprise processing circuitry 606 and storage 608. Control circuitry 604 may be used to send and receive commands, requests, and other suitable data using I/O path 602, which may comprise I/O circuitry. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing. While set-top box 615 is shown in FIG. 6 for illustration, any suitable computing device having processing circuitry, control circuitry, and storage may be used in accordance with the present disclosure. For example, set-top box 615 may be replaced by, or complemented by, a personal computer (e.g., a notebook, a laptop, a desktop), a smartphone (e.g., user equipment device 600), a tablet, a network-based server hosting a user-accessible client device, a non-user-owned device, any other suitable device, or any combination thereof.

Control circuitry 604 may be based on any suitable control circuitry such as processing circuitry 606. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for the image data processing system stored in memory (e.g., storage 608). Specifically, control circuitry 604 may be instructed by the image data processing system to perform the functions discussed above and below. In some implementations, processing or actions performed by control circuitry 604 may be based on instructions received from the image data processing system.

In client/server-based embodiments, control circuitry 604 may include communications circuitry suitable for communicating with a server or other networks or servers. The image data processing system may be a stand-alone application implemented on a device or a server. The image data processing system may be implemented as software or a set of executable instructions. The instructions for performing any of the embodiments discussed herein of the image data processing system may be encoded on non-transitory computer-readable media (e.g., a hard drive, random-access memory on a DRAM integrated circuit, read-only memory on a BLU-RAY disk, etc.). For example, in FIG. 6, the instructions may be stored in storage 608, and executed by control circuitry 604 of user equipment 600.

In some embodiments, the image data processing system may be or comprise a client/server application where only the client application resides on user equipment device 600, and a server application resides on an external server (e.g., one or more servers 604 of FIG. 6). For example, the image data processing system may be implemented partially as a client application on control circuitry 704 of user equipment device 700 and partially on server 704 as a server application running on control circuitry 711. Server 704 may be a part of a local area network with one or more of user equipment devices 700, 701 or may be part of a cloud computing environment accessed via the internet. In a cloud computing environment, various types of computing services for performing searches on the internet or informational databases, providing storage (e.g., for a database) or parsing data are provided by a collection of network-accessible computing and storage resources (e.g., server 704), referred to as "the cloud." User equipment device 600 may be a cloud client that relies on the cloud computing capabilities from server 704 to implement the image data processing system. When executed by control circuitry 604 or 711, the image data processing system may instruct control circuitry 604 or 711 circuitry to perform processing tasks for the client device and facilitate a media consumption session integrated with social network services. The client application may instruct control circuitry 604 to execute one or more of the systems and methods disclosed herein.

Control circuitry 604 may include communications circuitry suitable for communicating with a server, social network service, a table or database server, or other networks or servers The instructions for carrying out the above mentioned functionality may be stored on a server (which is described in more detail in connection with FIG. 6). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as image data described above. Nonvolatile memory may also be used (e.g., to launch a boot-up routine and other instructions). Cloud-based storage may be used to supplement storage 608 or instead of storage 608.

Control circuitry 604 may include video generating circuitry and tuning circuitry, such as one or more analog tuners, one or more H.265 decoders or any other suitable digital decoding circuitry, high-definition tuners, or any other suitable tuning or video circuits or combinations of such circuits. Encoding circuitry (e.g., for converting over-the-air, analog, or digital signals to H.265 signals for storage) may also be provided. Control circuitry 604 may also include scaler circuitry for upconverting and downconverting content into the preferred output format of user equipment 600. Control circuitry 604 may also include digital-to-analog converter circuitry and analog-to-digital converter circuitry for converting between digital and analog signals. The tuning and encoding circuitry may be used by user equipment device 600, 601 to receive and to display, to play, or to record content. The tuning and encoding circuitry may also be used to receive media consumption data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment device 600, the tuning and encoding circuitry (including multiple tuners) may be associated with storage 608.

Control circuitry 604 may receive instruction from a user by way of user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of each one of user equipment device 600 and user equipment device 601. For example, display 612 may be a touchscreen or touch-sensitive display. In such circumstances, user input interface 610 may be integrated with or combined with display 612. In some embodiments, user input interface 610 includes a remote-control device having one or more microphones, buttons, keypads, any other components configured to receive user input or combinations thereof. For example, user input interface 610 may include a handheld remote-control device having an alphanumeric keypad and option buttons. In a further example, user input interface 610 may include a handheld remote-control device having a microphone and control circuitry configured to receive and identify voice commands and transmit information to set-top box 615.

Audio output equipment 614 may be integrated with or combined with display 612. In some embodiments, display 612 may be any suitable display capable of being implemented as a modular 3D display. In some embodiments, display 612 may comprise one or more of a monitor, a television, a liquid crystal display (LCD) for a mobile device, amorphous silicon display, low-temperature poly-silicon display, electronic ink display, electrophoretic display, active matrix display, electro-wetting display, electro-fluidic display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 612. Audio output equipment 614 may be provided as integrated with other elements of each one of user equipment device 600 and user equipment device 601 or may be stand-alone units. An audio component of videos and other content displayed on display 612 may be played through speakers (or headphones) of audio output equipment 614. In some embodiments, audio may be distributed to a receiver (not shown), which processes and outputs the audio via speakers of audio output equipment 614. In some embodiments, for example, control circuitry 604 is configured to provide audio cues to a user, or other audio feedback to a user, using speakers of audio output equipment 614. There may be a separate microphone 616 or audio output equipment 614 may include a microphone configured to receive audio input such as voice commands or speech. For example, a user may speak letters or words that are received by microphone 616 and converted to text by control circuitry 604. In a further example, a user may voice commands that are received by a microphone and recognized by control circuitry 604. Camera 618 may be any suitable video camera integrated with the equipment or externally connected. Camera 618 may be a digital camera comprising a charge-coupled device (CCD) and/or a complementary metal-oxide semiconductor (CMOS) image sensor. Camera 618 may be an analog camera that converts to digital images via a video card.

The image data processing system may be implemented using any suitable architecture. For example, the image data processing system may be a stand-alone application wholly-implemented on each one of user equipment device 600 and user equipment device 601. In such an approach, instructions of the image data processing system may be stored locally (e.g., in storage 608), and data for use by the application may be downloaded on a periodic basis (e.g., from an out-of-band feed, from an Internet resource, or using another suitable approach). Control circuitry 604 may retrieve instructions of the image data processing system from storage 608 and process the instructions to execute machine learning models 502, 504 and 506 and/or perform the encoding processes and/or any other techniques discussed herein, and/or provide media consumption and/or social network interaction functionality and generate any of the displays discussed herein. Based on the processed instructions, control circuitry 604 may determine what action to perform when input is received from user input interface 610. For example, movement of a cursor on a display up/down may be indicated by the processed instructions when user input interface 610 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 604 may allow a user to provide user profile information or may automatically compile user profile information. For example, control circuitry 604 may access and monitor network data, video data, audio data, processing data, participation data from a social network profile, or any other suitable data, or any combination thereof. Control circuitry 604 may obtain all or part of other user profiles that are related to a particular user (e.g., via social media networks), and/or obtain information about the user from other sources that control circuitry 604 may access. As a result, a user can be provided with a unified experience across the user's different devices.

In some embodiments, the image data processing system may be a client/server-based application. Data for use by a thick or thin client implemented on each one of user equipment device 600 and user equipment device 601 may be retrieved on-demand by issuing requests to a server remote to each one of user equipment device 600 and user equipment device 601. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on user equipment device 600. This way, the processing of the instructions is performed remotely by the server while the resulting displays (e.g., that may include text, a keyboard, or other visuals) may be provided locally on user equipment device 600. User equipment device 600 may receive inputs from the user via input interface 610 and transmit those inputs to the remote server for processing and generating the corresponding displays. For example, user equipment device 600 may transmit a communication to the remote server indicating that an up/down button was selected via input interface 610. The remote server may process instructions in accordance with that input and generate a display of the application corresponding to the input (e.g., a display that moves a cursor up/down). The generated display may then be transmitted to user equipment device 600 for presentation to the user.

In some embodiments, the image data processing system may be downloaded and interpreted or otherwise run by an interpreter or virtual machine (run by control circuitry 604). In some embodiments, the image data processing system may be encoded in the ETV Binary Interchange Format (EBIF), received by control circuitry 604 as part of a suitable feed, and interpreted by a user agent running on control circuitry 604. For example, the image data processing system may be an EBIF application. In some embodiments, the image data processing system may be defined by a series of JAVA-based files that are received and run by a local virtual machine or other suitable middleware executed by control circuitry 604. In some of such embodiments (e.g., those employing VVC, H.265 or other digital media encoding schemes), the image data processing system may be, for example, encoded and transmitted in a VVC or H.265 object carousel with the VVC or H.265 audio and video packets of a program.

FIG. 7 is a diagram of an illustrative system 700, in accordance with some embodiments of this disclosure. System 700 may comprise one or more of media content source 702, one or more of server 704, one or more of database 705 and one or more of 3D display device 715 (e.g., comprising or otherwise coupled to 3D display 112, or any other suitable device, or any combination thereof), and/or any other suitable components. each of which may be coupled to communication network 706. In some embodiments, 3D display 715 may correspond to user equipment device 700 or user equipment device 701. Communication network 706 may be one or more networks including the Internet, a mobile phone network, mobile voice or data network (e.g., a 5G, 4G, or LTE network, or any other suitable network or any combination thereof), cable network, public switched telephone network, or other types of communication network or combinations of communication networks. Paths (e.g., depicted as arrows connecting the respective devices to the communication network 706) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 7 to avoid overcomplicating the drawing.

System 700 may comprise any suitable number of user equipment devices, and such devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 706. In some embodiments, the image data processing system may be executed at one or more of control circuitry 711 of server 704 (and/or control circuitry of 3D display device 715 and/or at media content source 702). In some embodiments, any suitable data structure related to image data and/or parallax frames and/or 2D parallax views, may be stored at database 705 maintained at or otherwise associated with server 704, and/or at storage at 3D display device 715.

In some embodiments, server 704 may include control circuitry 711 and storage 714 (e.g., RAM, ROM, hard disk, Removable Disk, etc.). Storage 714 may store one or more databases. Server 704 may also include an input/output (I/O) 712. I/O path 712 may provide media consumption data, social networking data, device information, or other data, over a local area network (LAN) or wide area network (WAN), and/or other content and data to control circuitry 711, which may include processing circuitry, and storage 714. Control circuitry 711 may be used to send and receive commands, requests, and other suitable data using I/O path 712, which may comprise I/O circuitry. I/O path 712 may connect control circuitry 711 (and specifically processing circuitry) to one or more communications paths.

Control circuitry 711 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 711 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 711 executes instructions for the image data processing system stored in memory (e.g., the storage 714). Memory may be an electronic storage device provided as storage 714 that is part of control circuitry 711.

Display device 715 may comprise one or more of each of GPU 722, encoder 716, decoder 718, CPU 720, storage 726, 3D display 112, video interface 732, I/O path 728, and image sensor 730. GPU 722 may correspond to a computing processor specially designed to quickly process video signals, and may be implemented as part of a graphics card. In some embodiments, GPU 722 may comprise encoder 716 and/or decoder 718, or encoder 716 and/or decoder 718 may be otherwise separately implemented within or external to 3D display device 715. In some embodiments, server 704 and/or media content source 702 may comprise or be part of a content delivery network (e.g., comprising one or more data centers, and/or edge device), with any suitable number of GPUs, e.g., configured to perform at least a portion of encoding and/or decoding of the image data. For example, 3D display device 715 may receive encoded data locally or over a communication network. In some embodiments, display device 715 may comprise any suitable hardware and/or software configured to perform multiplexing and/or demultiplexing of image data.

Decoder 718 may comprise any suitable combination of hardware and/or software configured to convert data in a coded form to a form that is usable as video signals and/or audio signals or any other suitable type of data signal, or any combination thereof. Encoder 716 may comprise any suitable combination of hardware and/or software configured to process data to reduce storage space required to store the data and/or bandwidth required to transmit the image data, while minimizing the impact of the encoding on the quality of the video or one or more images. Encoder 716 and/or decoder 718 may utilize any suitable algorithms and/or compression standards and/or codecs. In some embodiments, encoder 716 and/or decoder 718 may be a virtual machine that may reside on one or more physical servers that may or may not have specialized hardware, and/or a cloud service may determine how many of these virtual machines to use based on established thresholds. In some embodiments, separate audio and video encoders and/or decoders may be employed. In some embodiments, the functions of the decoder and encoder may be combined into a single entity, e.g., a programmed microcomputer which may perform a particular compression algorithm in both directions. In some embodiments, encoder 716 and/or decoder 718 may be part of, or external to, CPU 720. In some embodiments, encoder 716 and/or decoder 718 may comprise any suitable number of encoders, at a single location or distributed at any suitable number of locations.

CPU 720 may be implemented in a similar manner as control circuitry 704, and storage 726 may be implemented in a similar manner as storage 708. In some embodiments, interface 732 may be any suitable interface configured to transmit video and/or audio data to 3D display 112, and may utilize any suitable multiplexing or demultiplexing technique to combine or separate signals. In some embodiments, decoder 718 may be external to, or comprise part of, 3D display 112. I/O path 728 may be implemented in a similar manner as I/O path 702, and/or 3D display device 715 may include an image sensor implemented in a similar manner as camera 718. In some embodiments, image sensor 730 may comprise or be implemented as part of a 2D camera array or image sensor and internal microlens arrangement, configured to capture LF information of a scene. In some embodiments, 3D display device 715 may comprise or otherwise be coupled to synthetic content generator, e.g., as rendered by a 3D model or game engine, to enable 3D display 112 to render LF content with a virtual camera in an array of positions to create the same sort of representation, e.g., to provide a video game experience and/or virtual reality and/or augmented reality experience for a user. 3D display 112 may optionally comprise or otherwise be coupled to a light engine, which may be an array of LEDs and a driver circuit used to illuminate 3D display 112, e.g., an LF display. Any suitable technique and/or components may be used to display parallax views via 3D display 112, e.g., a backlight with multiple display layers, any suitable driver electronics or other displays, etc. The parallax views may be, e.g., real world scenes captured by a camera, or computer generated views or any combination thereof.

Figure 8:
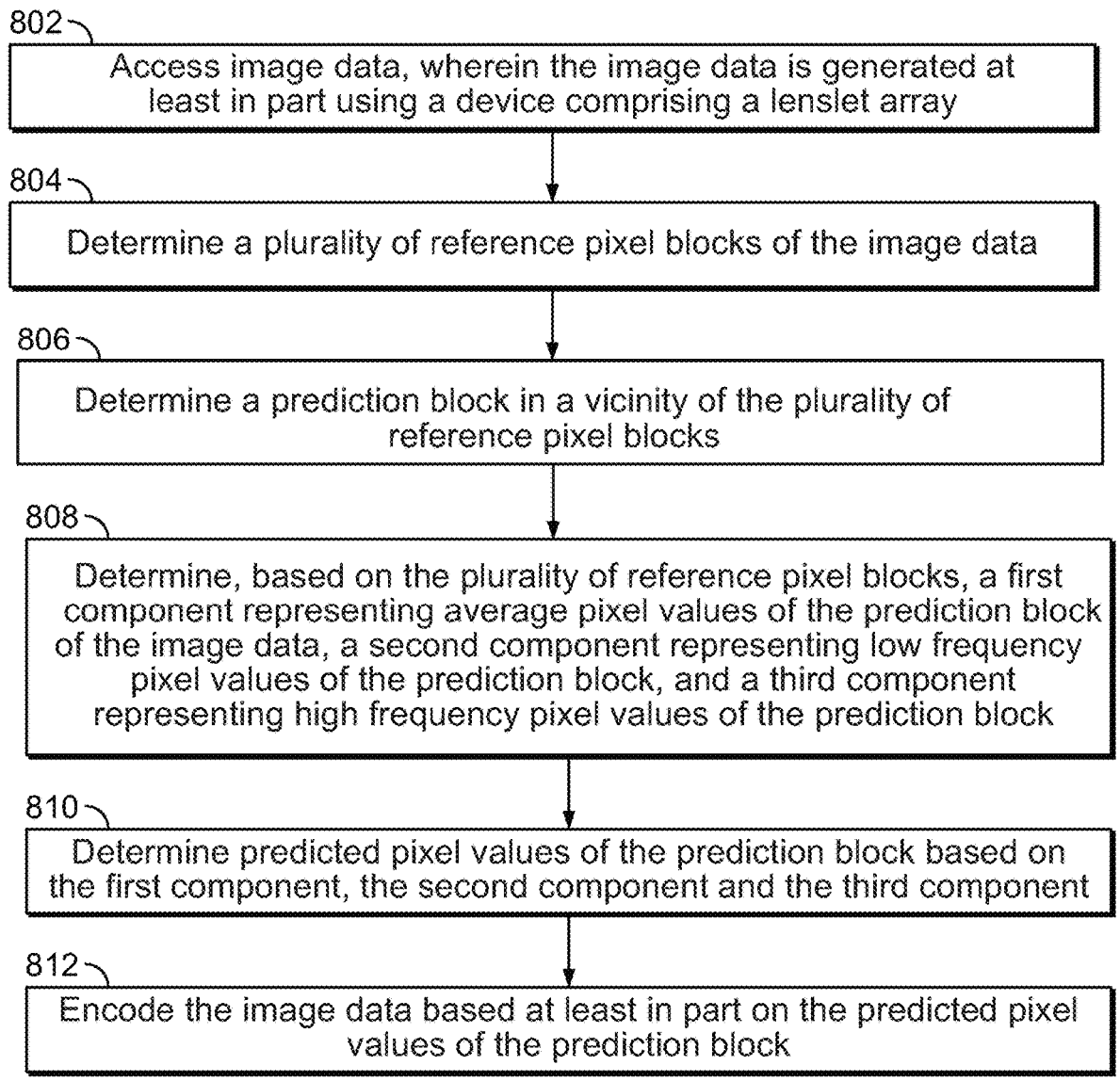
FIG. 8 is a flowchart of a detailed illustrative process for encoding image data for a 3D display, in accordance with some embodiments of this disclosure.

FIG. 8 is a flowchart of a detailed illustrative process for training a machine learning model to process image data for a multi-layer 3D display, in accordance with some embodiments of this disclosure. In various embodiments, the individual steps of process 800 may be implemented by one or more components of the devices and systems of FIGS. 1-7. Although the present disclosure may describe certain steps of process 800 (and of other processes described herein) as being implemented by certain components of the devices and systems of FIGS. 1-7, this is for purposes of illustration only, and it should be understood that other components of the devices and systems of FIGS. 1-7 may implement those steps instead. In addition, one or more steps of process 800 may be incorporated into or combined with one or more steps of any other process or embodiment (e.g., FIG. 8 or any other embodiment disclosed herein, or any combination thereof).

At 802, the image data processing system may access image data, wherein the image data may be generated at least in part using a device comprising a lenslet array. For example, the image data processing system may generate such image data or otherwise receive the image data over a network or otherwise retrieve the image data from storage 714 or media content source 702. The image data processing system may access such image data, and perform the subsequent steps of FIG. 8, as part of a process of encoding the image data for storage and/or transmission.

At 804, the image data processing system may determine a plurality of reference pixel blocks of the image data. For example, the image data processing system may be configured to determine a plurality of reference pixel blocks $ru_1$, $ru_2$, $ru_3$, $ru_4$, or any other suitable number of reference pixel blocks, using any suitable technique. In some embodiments, the image data processing system may determine a location and/or size of each of reference pixel blocks $ru_1$, $ru_2$, $ru_3$, $ru_4$ based at least in part on an arrangement or structure of the lenslet array 108, as discussed in FIG. 2. For example, the reference pixel blocks may span across certain portions of multiple macropixels or within a micropixel, the sizes of which may be specified by the camera manufacturer.

At 806, the image data processing system may determine a prediction block pu in a vicinity of reference pixel blocks $ru_1$, $ru_2$, $ru_3$, $ru_4$ within the image data In some embodiments, the image data processing system may identify a location and/or size of prediction block pu based on determining that pixels of prediction block pu are in a predefined vicinity of, and/or have similar pixel characteristics to, reference pixel blocks $ru_1$, $ru_2$, $ru_3$, $ru_4$. In some embodiments, prediction block pu may be of the same size as one or more of reference pixel blocks $ru_1$, $ru_2$, $ru_3$, $ru_4$. In some embodiments, the image data processing system may determine a location and/or size of each of prediction block pu at least in part on an arrangement or structure of the lenslet array 108, as discussed in FIG. 2.

At 808, the image data processing system may obtain components, e.g., frequency coefficients, of prediction block pu. For example, the image data processing system may determine a first component corresponding to one or more direct current (DC) coefficients representing a time average of pixel values of prediction block pu. The image data processing system may further obtain a second component corresponding to alternating current (AC) coefficients representing relatively lower frequencies associated with particular pixel values of prediction block pu. The image data processing system may further obtain a third component corresponding to relatively higher frequencies associated with particular pixel values of prediction block pu.

In some embodiments, the image data processing system may employ machine learning models 502, 504 and 506, which may be trained to predict such first, second and third components of prediction block pu. For example, model 502 may be trained using the DC coefficient of a DCT transform of a training prediction block, and reference pixel block values associated with the training prediction block. Model 504 may be trained using low frequency coefficients of a DCT transform of a training prediction block, and reference pixel block values associated with the training prediction block. Model 506 may be trained using high frequency coefficients of a DCT transform of a training prediction block, and reference pixel block values associated with the training prediction block.

At 810, the image data processing system may determine predicted pixel values of the prediction block based on the first component, the second component and the third component. For example, the outputs of the machine learning models 502, 504 and 506 may be obtained and organized into a zig-zag structure (FIG. 4) to facilitate identifying the coefficients representing portions of the prediction block likely to have a larger impact on a user's perception of an image associated with the prediction block, e.g., the lower frequency AC components. The image data processing system may obtain an iDCT (e.g., at 508 of FIG. 5), and the iDCT operation may result in obtaining reconstructed prediction block 510 in the pixel domain, e.g., predicted pixel values of prediction block pu based on the DCT coefficients output by models 502, 504 and 506.

At 812, the image data processing system may encode the image data based at least in part on the predicted pixel values of the prediction block. For example, the image data processing system may obtain the difference between the predicted pixel values of prediction block pu obtained at 806 and a ground truth value of prediction block pu. The difference may correspond to residual 514 which may be populated in a bitstream (e.g., generated by the image data processing system) representing the encoded image data. In some embodiments, any suitable number of processing steps may be performed in association with residual 514 in connection with the encoding. The process of FIG. 8 may be repeated any suitable number of times to encode each portion of the lenslet image and subsequent lenslet images, which may be included as part of a media asset, and such encoded data may be transmitted to a 3D display (e.g., 3D display 112 of FIG. 1) for decoding and presentation to an observer.

Figure 9:
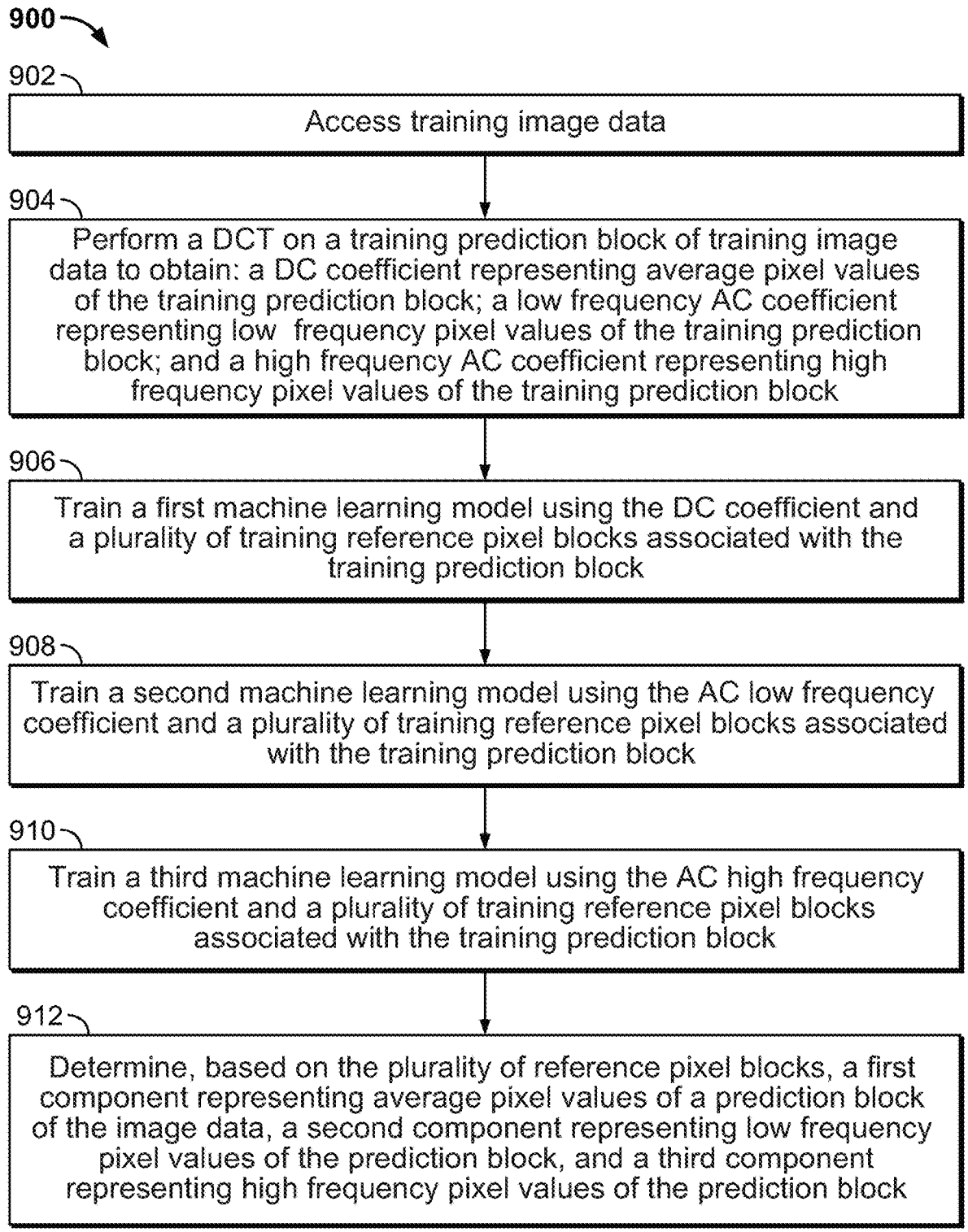
FIG. 9 is a flowchart of a detailed illustrative process for training machine learning models, in accordance with some embodiments of this disclosure.

FIG. 9 is a flowchart of a detailed illustrative process for training machine learning models, in accordance with some embodiments of this disclosure. In various embodiments, the individual steps of process 900 may be implemented by one or more components of the devices and systems of FIGS. 1-7. Although the present disclosure may describe certain steps of process 900 (and of other processes described herein) as being implemented by certain components of the devices and systems of FIGS. 1-7, this is for purposes of illustration only, and it should be understood that other components of the devices and systems of FIGS. 1-7 may implement those steps instead. In addition, one or more steps of process 900 may be incorporated into or combined with one or more steps of any other process or embodiment (e.g., FIGS. 8, 10, or any other embodiment disclosed herein, or any combination thereof).

At 902, the image data processing system may access training image data. Models 502, 504 and 506 may be trained with any suitable amount of training image data, e.g., various lenslet images from any suitable number and types of sources, including reference pixel blocks from such lenslet images and DCT coefficients (and ground truth pixel values of the prediction block) of a prediction block of the lenslet image. The training image data may be suitably formatted and/or labeled (e.g., with identities of various attributes and/or pixel values for the reference pixel blocks and/or prediction pixel blocks and/or DCT coefficients, by human annotators or editors or otherwise labeled via a computer-implemented process). As an example, such labels may be categorized metadata attributes stored in conjunction with or appended to the training image data.

At 904, the image data processing system may perform a DCT on a training prediction block of training image data to obtain a DC coefficient representing average pixel values of the training prediction block; a low frequency AC coefficient representing low frequency pixel values of the training prediction block; and a high frequency AC coefficient representing high frequency pixel values of the training prediction block. Additionally or alternatively, the image data processing system may decompose the prediction block using any other suitable technique, e.g., DCT, Discrete Fourier Transform (DFT), Fast Fourier Transform (FFT), Cosine Transform (CT), Wavelet Transform (WT), Short Time Fourier Transform (STFT) or any other suitable digital signal processing algorithm or technique, or any combination thereof.

At 906, the image data processing system may train a first machine learning model (e.g., model 502 of FIG. 5) using the DC coefficient and a plurality of training reference pixel blocks associated with the training prediction block. For example, model 502 may be trained using the DC coefficient and a plurality of training reference pixel blocks associated with the training prediction block.

At 908, the image data processing system may train a second machine learning model (e.g., model 504 of FIG. 6) using one or more AC low frequency coefficients and a plurality of training reference pixel blocks associated with the training prediction block. Model 504 may be trained to learn patterns with respect to correlating particular low frequency AC DCT coefficients with certain combinations of reference pixels and prediction block pixels.

At 910, the image data processing system may train a third machine learning model (e.g., model 506 of FIG. 5) using one or more AC high frequency coefficients and a plurality of training reference pixel blocks associated with the training prediction block. For example, model 506 may be trained to learn patterns with respect to correlating particular high frequency AC DCT coefficients with certain combinations of reference pixels and prediction block pixels. Each of the first machine learning model, the second machine learning model and the third machine learning model may be a multilayer perceptron (MLP) neural network.

Once each of the first, second and third machine learning models is trained using any suitable number of training cycles and training data, processing may proceed to 806 of FIG. 8, which may be performed using the trained first, second and third machine learning models. For example, a plurality of reference pixel blocks $ru_1$, $ru_2$, $ru_3$, $ru_4$ may be input to each machine learning model, as discussed in connection with Table 1. Model 502 may output a DC coefficient representing average pixel values of prediction block pu associated with reference pixel blocks $ru_1$, $ru_2$, $ru_3$, $ru_4$. Model 504 may output low frequency coefficients representing low frequency pixel values of prediction block pu associated with reference pixel blocks $ru_1$, $ru_2$, $ru_3$, $ru_4$. Model 506 may output high frequency coefficients representing high frequency pixel values of prediction block pu associated with reference pixel blocks $ru_1$, $ru_2$, $ru_3$, $ru_4$. In some embodiments, fringe features F, described in connection with Table 10, may be input to one or more of such machine learning models, in addition to reference pixel blocks $ru_1$, $ru_2$, $ru_3$, $ru_4$.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method, comprising:
    accessing image data, wherein the accessed image data is generated at least in part using a device comprising a lenslet array;
    determining a plurality of reference pixel blocks of the image data;
    determining a prediction block in a vicinity of the plurality of reference pixel blocks;
    determining, based on the plurality of reference pixel blocks, a first component representing average pixel values of the prediction block, a second component representing low frequency pixel values of the prediction block, and a third component representing high frequency pixel values of the prediction block, wherein:
        determining the first component comprises inputting the plurality of reference pixel blocks to a first machine learning model trained to accept as input image data and output a DC discrete cosine transform (DCT) coefficient of a prediction block associated with the input image data;
        determining the second component comprises inputting the plurality of reference pixel blocks to a second machine learning model trained to accept as input image data and output a low frequency AC DCT coefficient; and
        determining the third component comprises inputting the plurality of reference pixel blocks to a third machine learning model trained to accept as input image data and output a high frequency AC DCT coefficient;
    determining predicted pixel values of the prediction block based on the first component, the second component and the third component; and
    encoding the accessed image data based at least in part on the predicted pixel values of the prediction block.

2. The method of claim 1, wherein a size and location of each of the plurality of reference pixel blocks is determined based on an arrangement of the lenslet array of the device and resulting sizes of a plurality of macropixels of the image data.

3. The method of claim 1, further comprising:
    performing a DCT on a training prediction block of training image data to obtain:
        a DC coefficient representing average pixel values of the training prediction block;
        a low frequency AC coefficient representing low frequency pixel values of the training prediction block; and
        a high frequency AC coefficient representing high frequency pixel values of the training prediction block;
    training the first machine learning model using the DC coefficient and a plurality of training reference pixel blocks associated with the training prediction block;
    training the second machine learning model using the AC low frequency coefficient and the plurality of training reference pixel blocks; and
    training the third machine learning model using the AC high frequency coefficient and the plurality of training reference pixel blocks.

4. The method of claim 1, wherein determining the first component further comprises inputting to the first machine learning model one or more values of pixels adjacent to at least one of the plurality of reference pixel blocks.

5. The method of claim 1, wherein determining the first component further comprises inputting to the first machine learning model one or more values of pixels adjacent to the prediction block.

6. The method of claim 1, wherein each of the first machine learning model, the second machine learning model and the third machine learning model is a multilayer perceptron (MLP) neural network.

7. The method of claim 1, wherein determining the predicted pixel values further comprises:
    computing an inverse DCT (iDCT) of each of the first component, the second component and the third component.

8. The method of claim 1, wherein the plurality of reference pixel blocks are identified by decoding and reconstructing a portion of a bitstream corresponding to previously encoded portions of the image data.

9. The method of claim 1, wherein encoding the accessed image data based at least in part on the predicted pixel values of the prediction block comprises:
    computing a difference between the predicted pixel values of the prediction block and pixel values of the prediction block;
    generating a bitstream comprising an indication of the computed difference; and
    transmitting the bitstream for decoding of the encoded image data, and display of the decoded image data, at a device.

10. A computer-implemented system comprising:
    input/output (I/O) circuitry;
    control circuitry configured to:
        access image data, wherein the accessed image data is generated at least in part using a device comprising a lenslet array and is received via the I/O circuitry;
        determine a plurality of reference pixel blocks of the image data;
        determine a prediction block in a vicinity of the plurality of reference pixel blocks;
        determine, based on the plurality of reference pixel blocks, a first component representing average pixel values of the prediction block, a second component representing low frequency pixel values of the prediction block, and a third component representing high frequency pixel values of the prediction block, wherein the control circuitry is further configured to:
  determine the first component by inputting the plurality of reference pixel blocks to a first machine learning model trained to accept as input image data and output a DC discrete cosine transform (DCT) coefficient of a prediction block associated with the input image data;
  determine the second component by inputting the plurality of reference pixel blocks to a second machine learning model trained to accept as input the image data and output a low frequency AC DCT coefficient; and
  determine the third component by inputting the plurality of reference pixel blocks to a third machine learning model trained to accept as input the image data and output a high frequency AC DCT coefficient;
  determine predicted pixel values of the prediction block based on the first component, the second component and the third component; and
  encode the accessed image data based at least in part on the predicted pixel values of the prediction block.

11. The system of claim 10, wherein a size and location of each of the plurality of reference pixel blocks is determined based on an arrangement of the lenslet array of the device and resulting sizes of a plurality of macropixels of the image data.

12. The system of claim 10, wherein the control circuitry is further configured to:
  perform a DCT on a training prediction block of training image data to obtain:
    a DC coefficient representing average pixel values of the training prediction block;
    a low frequency AC coefficient representing low frequency pixel values of the training prediction block; and
    a high frequency AC coefficient representing high frequency pixel values of the training prediction block;
  train the first machine learning model using the DC coefficient and a plurality of training reference pixel blocks associated with the training prediction block;
  train the second machine learning model using the AC low frequency coefficient and the plurality of training reference pixel blocks; and
  train the third machine learning model using the AC high frequency coefficient and the plurality of training reference pixel blocks.

13. The system of claim 10, wherein the control circuitry is further configured to determine the first component by inputting to the first machine learning model one or more values of pixels adjacent to at least one of the plurality of reference pixel blocks.

14. The system of claim 10, wherein the control circuitry is further configured to determine the first component further comprises inputting to the first machine learning model one or more values of pixels adjacent to the prediction block.

15. The system of claim 10, wherein each of the first machine learning model, the second machine learning model and the third machine learning model is a multilayer perceptron (MLP) neural network.

16. The system of claim 10, wherein the control circuitry is further configured to determine the predicted pixel values further comprises:
  computing an inverse DCT (iDCT) of each of the first component, the second component and the third component.

17. The system of claim 10, wherein the control circuitry is configured to identify the plurality of reference pixel blocks by decoding and reconstructing a portion of a bitstream corresponding to previously encoded portions of the image data.

18. The system of claim 10, wherein the control circuitry is configured to encode the image data based at least in part on the predicted pixel values of the prediction block by:
  computing a difference between the predicted pixel values of the prediction block and pixel values of the prediction block;
  generating a bitstream comprising an indication of the computed difference; and
  transmitting the bitstream for decoding of the encoded image data, and display of the decoded image data, at a device.

* * * * *